US008514742B2

(12) United States Patent
Matsuo et al.

(10) Patent No.: US 8,514,742 B2
(45) Date of Patent: Aug. 20, 2013

(54) NODE DEVICE, INFORMATION PROCESS METHOD, AND RECORDING MEDIUM RECORDING NODE DEVICE PROGRAM

(75) Inventors: Hideki Matsuo, Nagoya (JP); Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 625 days.

(21) Appl. No.: 12/232,599

(22) Filed: Sep. 19, 2008

(65) Prior Publication Data

US 2009/0028070 A1 Jan. 29, 2009

Related U.S. Application Data

(63) Continuation-in-part of application No. PCT/JP2007/055702, filed on Mar. 20, 2007.

(30) Foreign Application Priority Data

Apr. 28, 2006 (JP) ................................ 2006-125030

(51) Int. Cl.
*H04L 12/28* (2006.01)
(52) U.S. Cl.
USPC ............................ 370/254; 370/255; 709/223
(58) Field of Classification Search
USPC ................. 370/256, 408, 420, 468, 254, 255; 709/223
See application file for complete search history.

(56) References Cited

U.S. PATENT DOCUMENTS

| 6,175,874 | B1 * | 1/2001 | Imai et al. ..................... 709/238 |
| 6,718,326 | B2 * | 4/2004 | Uga et al. ............... 707/999.003 |
| 7,120,125 | B2 * | 10/2006 | Kikuchi et al. ............... 370/252 |
| 7,194,002 | B2 * | 3/2007 | Zhang et al. .................. 370/400 |
| 7,324,824 | B2 * | 1/2008 | Smith et al. ................ 455/456.1 |

(Continued)

FOREIGN PATENT DOCUMENTS

| JP | A-2004-265273 | 9/2004 |
| JP | A-2005-353039 | 12/2005 |
| JP | A-2006-101277 | 4/2006 |

OTHER PUBLICATIONS

Haba et al.; "Hierarchical Distributed Hashing in Consideration of Physical Network"; IPSJ SIG Technical Report; Feb. 16, 2006; pp. 43-48 (with Abstract).

(Continued)

*Primary Examiner* — Brian O'Connor
(74) *Attorney, Agent, or Firm* — Oliff & Berridge, PLC

(57) ABSTRACT

A node device in an overlay network formed by a plurality of node devices comprises: a memory unit that memorizes a plurality of routing tables where a plurality of node identification information are registered, the node identification information is indicative of identifying the node device from other node devices; and a searching unit that searches the node device as a destination of a message transmission by referring to the routing tables. The node device also comprises a transmitting unit that transmits the message to the node device searched by the searching unit. An amount of the node identification information which can be registered in the routing table to be first referred to by the searching unit is more than an amount of the node identification information which can be registered in the routing table other than the routing table to be first referred.

16 Claims, 18 Drawing Sheets

(56) References Cited

U.S. PATENT DOCUMENTS

| | | | |
|---|---|---|---|
| 7,349,370 B2* | 3/2008 | Lee et al. | 370/328 |
| 7,450,580 B2* | 11/2008 | Itonaga et al. | 370/392 |
| 7,554,930 B2* | 6/2009 | Gaddis et al. | 370/254 |
| 7,558,875 B2* | 7/2009 | Zhang et al. | 709/238 |
| 7,881,223 B2* | 2/2011 | Shim et al. | 370/254 |
| 8,000,315 B2* | 8/2011 | Doi et al. | 370/351 |
| 8,041,942 B2* | 10/2011 | Narayanan et al. | 713/156 |
| 2003/0101253 A1* | 5/2003 | Saito et al. | 709/223 |
| 2003/0120917 A1* | 6/2003 | Itonaga et al. | 713/163 |
| 2005/0243740 A1 | 11/2005 | Chen et al. | |
| 2007/0230468 A1* | 10/2007 | Narayanan et al. | 370/392 |
| 2009/0052366 A1* | 2/2009 | Doi et al. | 370/315 |

OTHER PUBLICATIONS

Shiraishi et al.; "An Efficient Message Forwarding Method using Chord in P2P Networks"; IEICE Technical Report; Feb. 23, 2006; pp. 121-124 (with Abstract).

Nakamura et al.; "High Availability of DHT Lookup in Partitioned Networks"; IEICE Technical Report; Mar. 7, 2005; pp. S-26-S-27 (with Absract).

Oka et al.; "Lightweight Load Balancing for Distributed Hash Tables"; Technical Report of IEICE; Feb. 5, 2004; pp. 7-12; vol. 103, No. 650 (with Abstract).

Zhao et al.; "Tapestry: An Infrastructure for Fault-tolerant Wide-area Location and Routing"; Report No. UCB/CSD-01-1141; Apr. 2001; pp. 1-27; University of California Berkeley.

* cited by examiner

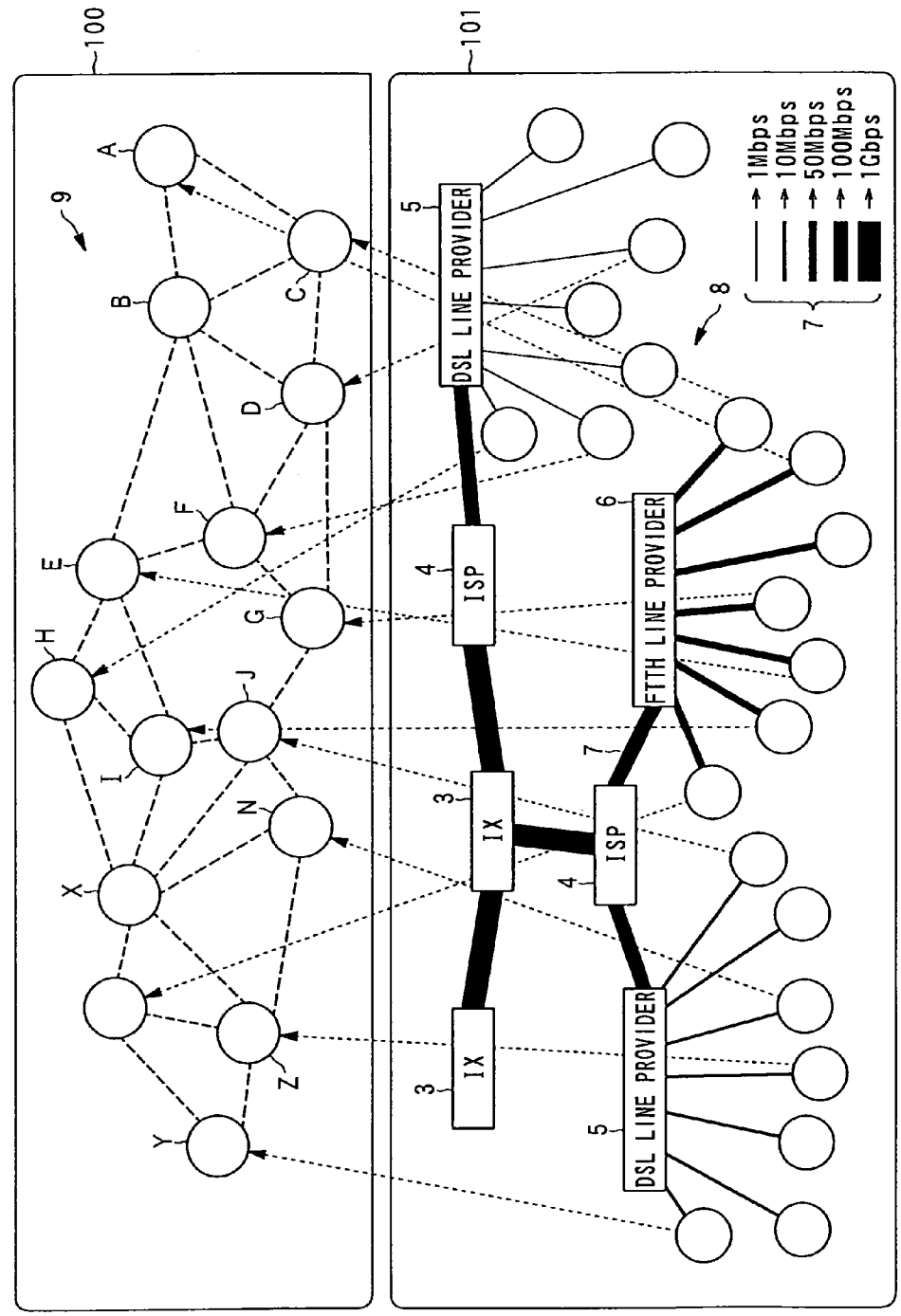

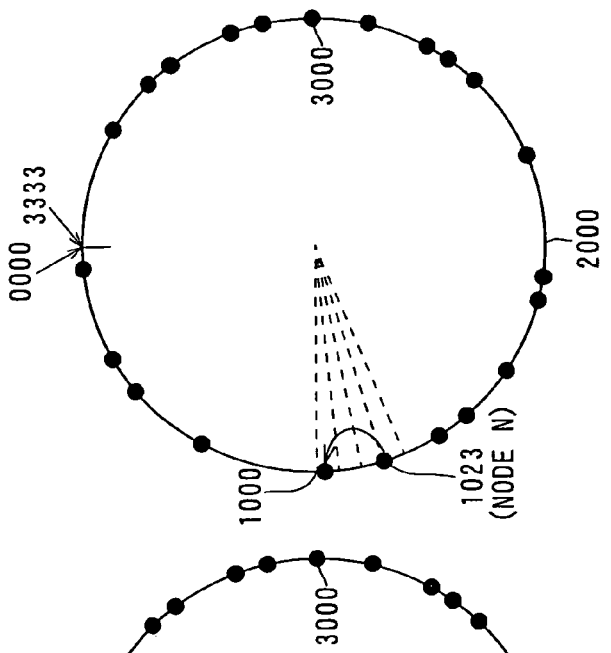
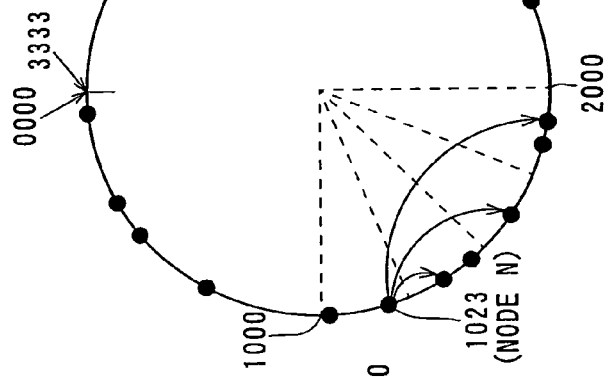
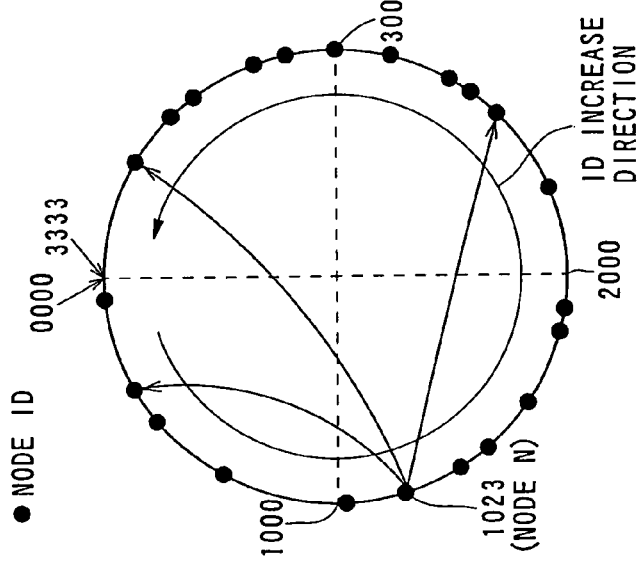

FIG. 3A

| 0130 | 1023 | 2203 | 3220 |
|---|---|---|---|
| IP ADDRESS 0 | — | IP ADDRESS 2 | IP ADDRESS 3 |

FIG. 3B

| 1023 | 1132 | 1202 | 1321 |
|---|---|---|---|
| — | IP ADDRESS 4 | IP ADDRESS 5 | IP ADDRESS 6 |

FIG. 3C

| 1000 | — | 1023 | — |
|---|---|---|---|
| IP ADDRESS 7 | — | — | — |

FIG. 3D

|  | ATTENTION DIGIT 0 IN EACH LEVEL | ATTENTION DIGIT 1 IN EACH LEVEL | ATTENTION DIGIT 2 IN EACH LEVEL | ATTENTION DIGIT 3 IN EACH LEVEL |
|---|---|---|---|---|
| LEVEL 1 | 0130 | 1023 | 2203 | 3220 |
|  | IP ADDRESS 0 | — | IP ADDRESS 2 | IP ADDRESS 3 |
| LEVEL 2 | 1023 | 1132 | 1202 | 1321 |
|  | — | IP ADDRESS 4 | IP ADDRESS 5 | IP ADDRESS 6 |
| LEVEL 3 | 1000 | — | 1023 | — |
|  | IP ADDRESS 7 | — | — | — |
| LEVEL 4 | — | — | — | 1023 |
|  | — | — | — | — |

NODE DEVICE, INFORMATION PROCESS METHOD, AND RECORDING MEDIUM RECORDING NODE DEVICE PROGRAM

The entire disclosures of Japanese Patent Application No. 2006-125030 filed on Apr. 28, 2006 including the specification, claims, drawings and summary are incorporated herein by reference in its entirety.

BACKGROUND OF THE INVENTION

1. Field of the Invention

The present invention belongs to the field of a node device, an information process method, and a node device program, particularly a node device included in a delivery system delivering contents (delivery information) such as movies through a network such as internet, an information process method carried out in the node device, and a recording medium recording a node device program provided in the information process of the node device.

2. Discussion of the Related Art

Recently research and development has been active on so-called content delivery wherein a server or the like accumulating the contents through a network such as internet is connected from a terminal device, and the contents desired to view in the terminal device are delivered to the terminal device and viewed there.

Here, as exemplified in Japanese Unexamined Patent Publication No. 2004-265273, the conventional delivery system delivering the contents has a basic configuration, wherein a server or the like accumulating contents is connected from a terminal device desiring content delivery through the network, and upon establishment of the connection, delivery of the desired contents, in other words, the transmission of the content data corresponding to the contents is received in the terminal device.

On the other hand, recently as another configuration of delivery system delivering the contents, there has been a delivery system of so-called peer-to-peer (P2P) grid type (simply referred to a "delivery system" hereinafter). Here the delivery system is a delivery system that delivers the contents using the network and where content data corresponding to the contents are mutually and directly given and received among terminal devices belonging to the network (i.e. contents being shared among plural terminal devices). All the terminal devices participating in the delivery system have function as the server and as delivery destination device receiving delivery of the contents (the terminal device being simply referred to as a "node" in the explanation below).

In the delivery system, in a case where content delivery is received in a given node, in the node, a pair of information: node identification information for identifying in the network the other nodes accumulating content data corresponding to the contents desired to deliver; and content identification information for identifying the contents from the other contents (the pair of information being referred to as "index information") is referred to, and delivery of the desired content is required to receive from the node indicated by the node identification information in this index information.

Then, the general delivery system has a configuration as exemplified by the below-mentioned Patent Document 1, where the index information related to one or plural contents is respectively memorized (distributed and memorized) in the plural nodes as a whole, and these are referred to from the node receiving the content delivery. More specifically, in a case where the network forming the delivery system is, for example, internet, it is necessary to recognize a pair of search information capable of specifying the content desired to deliver (e.g. movie title) and IP (Internet Protocol) address of the node memorizing thereof and give and receive the contents desiring the IP address as a key.

Therefore, in the delivery system like the above-mentioned delivery system where unspecified nodes share contents with each other, respective nodes are required to recognize a pair of search information of all the contents and IP addresses of the nodes memorizing thereof.

However, in a case where the number of nodes connected to the network increases, it is not realistic that respective nodes respectively record search information of all the contents and IP addresses of the nodes memorizing the contents because of restriction of physical memory capacity in the respective nodes or the like (e.g. it is not absolutely realistic that respective nodes record all IP addresses of million units when nodes of million units are connected to a network).

Further, in a case where respective nodes record search information of all the contents and IP addresses memorizing thereof, and in a case where power is frequently turned on and off in respective nodes of the network (e.g. power on and off being frequently operated in a case where the node is realized by a personal computer), IP address or the like recorded by the respective nodes are frequently updated, and actual operation of an entire network becomes difficult.

Then, in order to deal with the above-mentioned problems, a delivery system is studied, where only index information including IP addresses of necessary minimum nodes is recorded and, with respect to the other nodes not recognizing IP address thereof, contents to be delivered to the node and messages necessary required for the delivery are transferred through the other node to deliver. One of them is a delivery system using DHT (Distributed Hash Table) as disclosed in "Lightweight Load Balancing for Distributed Hash Tables" by Toshio Oka, Hiroyuki Morikawa, Tomonori Aoyama; Technical Report of IEICE, (Japan), The Institute of Electronics, Information and Communication Engineers; Feb. 5, 2004, Vol. 103, No. 650, p. 7-12".

Next, summary of the delivery system using the DHT will be described. In the delivery system using the DHT, a node ID (Identification) is added to the respective nodes to mutually identify the respective nodes. Here, the node ID is provided with a number that is unique to every node, in other words, a number different from the other nodes in the delivery system where the nodes participate. This number is a bit number (bit length) enough to accommodate maximum operation number of node in the network. More specifically, for example, when the node ID of 128 bits is used, $2^{128} \approx 340 \times 10^{36}$ units of nodes can be connected to a single network. A value obtained by applying a hash function to inherent value, of the respective nodes, such as IP address provided to the node itself, so-called MAC (Media Access Control) address, or manufacture number of the node itself is generally used as the node ID.

Further, in the delivery system using the DHT, a unique content ID different from the other content is provided to the content itself delivered by the delivery system as the content identification information corresponding thereto. A bit length of this content ID is same as that of the above-mentioned node ID. A value obtained by applying a hash function to title data indicative of the content title, attribute data indicative of attribute of data forming the content, data of a portion of front several bits among data forming the content, or the like is generally used as the content ID.

In order to realize a configuration where the content to be delivered to the node is transferred and delivered with respective to the other node not recognizing the above-mentioned IP address through the other node, "routing table" is used in the delivery system using DHT.

Although this routing table is described in detail later, generally speaking the routing table are memorized in the respective nodes, and all of the nodes in the delivery system are hierarchically classified based on predetermined condition (e.g. conditions set by a value of respective node IDs indicative of respective nodes), the above-mentioned node ID indicative of a transferable node is described every node group that is obtained by the hierarchical classification.

In a case where the message, the content, or the like is sent and addressed to the specific node (or attaching the content ID indicative of the desired content), the node being the sending source sends the message or the like to a given node indicated by the node ID described in the routing table memorized by the own, and further, the given node receiving the message or the like transfers the message or the like to the other node indicated by the node ID described in the routing table memorized by the own. It is in such a configuration that transfer process is repeated each of the hierarchy in the hierarchical node group, so that the message or the like finally reaches the target node.

SUMMARY OF THE INVENTION

However, according to the above-mentioned conventional routing table, in a case where a node ID becomes invalid, for example, because the node indicated by a node ID currently described withdraws from the delivery system, the fact that it is invalid is recognized only after the message or the like is actually sent to the node indicated by the node ID (invalid node ID). In such the case, there is a problem that transfer efficiency of a message or the like is extremely reduced in a case where the invalid node ID is described as a result, because the process of searching a new node (valid node) again becomes necessary.

Thus, the present invention is provided in view of the above problems, and an object of the present invention is to provide a node device capable of transmitting a message or the like efficiently and promptly, an information process method carried out in the node device, and a recording medium recording a node device program provided for information process in the node device, in the delivery system.

According to the present invention, in a node identification information memory means, the capacity number of memories of the node identification information corresponding to the node device belonging to the highest hierarchy level in the tree diagram indicative of a hierarchy structure of the node group is not smaller than the capacity number of memories of the node identification information corresponding to the node device belonging to any other level but the highest hierarchy level. Therefore, the capacity number of memories in the node device of the node identification information capable of giving and receiving information is set large in the highest hierarchy level, so that alternative node identification information can be promptly discovered and information is given and received efficiently and promptly.

To solve the above problem, according to a first aspect of the present invention, there is provided a node device included in a network that is formed by a plurality of node devices mutually connected to carry out giving and receiving of information, the node devices respectively having inherent node identification information for identifying from the other node devices and classified into any one of node groups that are obtained by hierarchically classifying the network into a tree diagram, including:

a node identification information memory means for memorizing a plurality of node identification information pieces corresponding respectively to the other node devices provided for the giving and receiving; and a reference means used for the giving and receiving respectively in reference of the node identification information memorized, wherein, in the node identification information memory means, a capacity number of memories of the node identification information pieces corresponding to the node device that belongs to the highest hierarchy level in the tree diagram is the same as a capacity number of memories of the node identification information pieces corresponding to the node devices belonging to any one of hierarchy levels other than the highest hierarchy level or more.

Accordingly, the node identification information memory means is constructed that the capacity number of memories of the node identification information piece corresponding to the node device that belongs to the highest hierarchy level in the tree diagram indicative of the hierarchy structure of the node group is the same as a capacity number of memories of node identification information piece corresponding to a node device in any one of hierarchies other than that of the highest level or more. By making a capacity number of memories in a node device corresponding to the node identification information piece provided for the giving and receiving of the information as an alternative increase in the highest level, it is possible to efficiently and rapidly carry out the giving and receiving of the information by rapidly discovering node identification information piece as the alternative even in a case where an accident such as dropout of a terminal from a network occurs.

According to the present invention, in a node identification information memory means, a capacity number of memories of the node identification information corresponding to the node device belonging to the highest hierarchy level in the tree diagram indicative of a hierarchy structure of the node group is not smaller than a capacity number of memories of the node identification information in correspondence with the node device belonging to any other level but the highest hierarchy level. Therefore, a capacity number of memories in the node device of the node identification information capable of giving and receiving information is set large in the highest hierarchy level, so that alternative node identification information can be promptly discovered and information is given and received efficiently and promptly.

BRIEF DESCRIPTION OF THE DRAWINGS

FIG. 1 is a view showing an example of connection status of respective nodes in a delivery system according to the present embodiment.

FIG. 2 is a view showing an example of state that a routing table is created in the delivery system according to the embodiment, wherein (A) shows a first example, (B) shows a second example, and (C) shows a third example.

FIG. 3 is a view showing an example of the routing table actually created in the delivery system according to the embodiment, wherein (A) shows a first example, (B) shows a second example, (C) shows a third example, and (D) shows a fourth example.

DETAILED DESCRIPTION OF THE PREFERRED EMBODIMENTS

Figure 4:
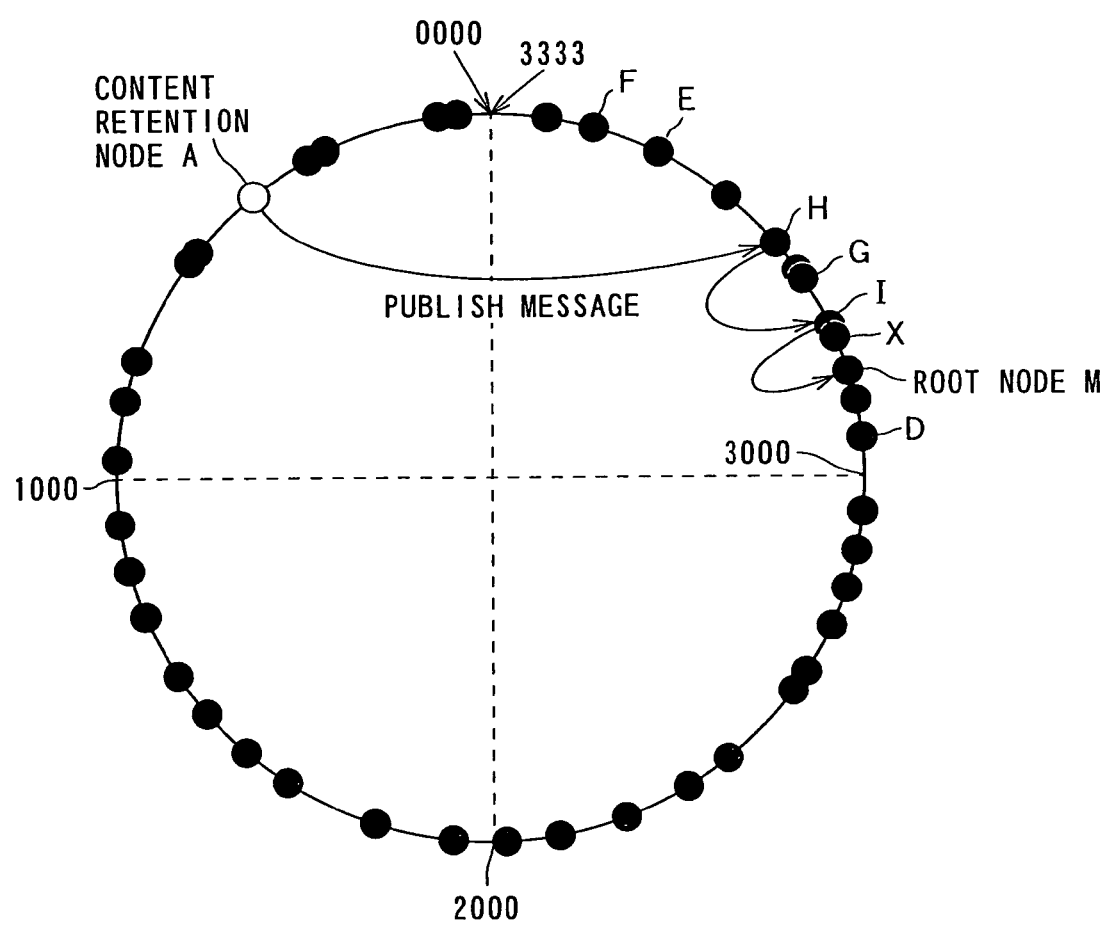
FIG. 4 is a schematic view showing an example of a flow of a publish message in delivery system according to the embodiment.

Each designation of numerical reference in the drawings is typically as follows:
11 Control unit;
12 Memory unit;
13 Buffer memory;
14 Decoder unit;
15 Image processing unit;
16 Display unit;
17 Audio processing unit;
18 Speaker;
20 Communication unit;
21 Input unit;
22 Bus;
S Delivery system;
N Node;
RT, RRT Routing table;
MR Main table;
R1, R2, R3, RR1, RR2, RR3 Sub-table; and
E, ME1, R1E1, R2E1, R3E1, RR1E1, RR2E1, RR3E1 Entry Hereinafter, embodiments of the present invention will be described in reference of drawings. Here, the embodiments explained below are embodiments wherein the present invention is applied to the above-mentioned delivery system for delivering the contents using a network such as internet.

(I) Overall Configuration and the Like of Delivery System

First, with reference to FIG. 1, schematic configuration and the like of the above-mentioned delivery system according to the embodiment will be described. FIG. 1 is a view showing an example of connection status of respective nodes in a delivery system according to the present embodiment.

As shown in lower frame 101 in FIG. 1, a network (physical network in the real world) 8 such as Internet is constructed by an internet exchange (IX) 3, internet service providers (ISP) 4, digital subscriber line (DSL) providers (or device thereof) 5, fiber to the home (FTTH) line provider (or device thereof) 6, and communication line (e.g. a phone line or an optical cable) 7 and the like. Although a router for transferring a message (packet) is appropriately inserted in the network (communication network) 8 in an example of FIG. 1, it is not shown in FIG. 1.

The delivery system S according to the embodiment is provided with plural nodes A, B, C, . . . X, Y, Z . . . that are mutually connected through such the network 8. An inherent manufacturing number and the IP address as address information are allocated to each of the nodes A, B, C, . . . X, Y, Z . . . . These manufacturing number and IP address are not to be duplicated among plural nodes.

In the delivery system S, an overlay network 9 is configured by an algorithm using the DHT as shown in an upper frame 100 of FIG. 1. In other words, the overlay network 9 is a network configuring a virtual link formed by use of an existing (physical) network 8.

In the embodiment described below, an overlay network 9 configured by an algorithm using this DHT is premised, and nodes allocated to this overlay network 9 are generally referred to as nodes "participating" in the overlay network 9. Here, participation into the overlay network 9 is done when a non-participating node sends a participation request message to an arbitrary node already participating.

On the other hand, as described above, respective nodes have a node ID as inherent node identification information (as mentioned above, a node ID having a hash value that is formed by constant digit number and obtained by hashing with common hash function (e.g. SHA-1)), and the nodes I are distributed and allocated in one ID space without deviation (ID space is described later in detail). The node ID obtained by a common hash function has very low possibility of having the same value in a case where the IP address or the manufacturing number differs. With respect to the hash function, detailed explanation is omitted because the hash function is well known.

(II) Ordinary Operation Method and the Like of Routing Table in DHT

Next, an example of a method of creating a routing table being a specific content of the above-mentioned DHT, and a content search method using thereof will be described with reference to FIGS. 2 and 3. FIG. 2 is a view showing an example of state where a routing table is created and FIG. 3 is a view showing an example of a routing table actually created.

(i) Creating Method of Routing Table

As mentioned above, because the node IDs provided to respective nodes are generated by a common hash function, they are considered to be dispersed and located in the same ring-shape ID space without much deviation as shown in FIGS. 2(A) to 2(C). In the figures, the node ID is provided at 8 bits and illustrated. A black dot in the figure indicates a node ID, and ID increases counterclockwise.

In a case where the above-mentioned creation of the routing table is considered, first, as shown in FIG. 2(A), the ID space is divided (separated) into several areas as groups (node group) according to a rule of the above-mentioned ID space. Although actually the ID space divided into about sixteen areas is often used, the ID space is quadrisected for easy explanation here, and ID is expressed by quaternary number of bit length of 8 bits. A node ID of a node N is set to "1023", and a routing table of this node N is created.

(A) Routing Level 1

As exemplified in FIG. 2(A), when the ID space is quadrisected, it is divided into four areas having different maximum digit, "0XXX", "1XXX", "2XXX", and "3XXX" (X being integer number of 0 to 3, similar to this hereinafter) that are expressed by quaternary number. Because the node ID of the node N itself is "1023", the node N is located in the area "1XXX" at the lower left of the figure.

The node N arbitrarily selects, as a representative respective nodes, respective nodes located in the area other than the area where the own exists (i.e. area "1XXX") (i.e. node belonging to the other node group in level 1). The IP address and the like (actually including a port number, similar hereinafter) of thus selected node ID are registered (memorized) in the respective columns in the routing table of level 1 to be memorized in the node N (respective matrix-shape columns forming the routing table are referred to as "entry" hereinafter). FIG. 3(A) is an example of level 1 of the routing table. Because the entry of the second column of the level 1 in the routing table indicates the node N itself, the IP address and the like need not to be registered.

(B) Routing Level 2

Next, as shown in FIG. 2(B), among the areas thus quadrisected by routing, the area where the own exists is further quadrisected into four areas "10XX", "11XX", "12XX", "13XX" (i.e. a node group where the node N itself belongs being further divided into small node groups).

In a manner similar to the case of level 1, the respective nodes existing in an area other than the area where the own exists (area further divided in FIG. 2(B)) are arbitrarily selected as a representative node, and the IP address or the like of the node ID is registered in respective entries in the level 2 of the routing table. Here, FIG. 3(B) is an example of the routing table. Since the entry of the first column of the level 2 in the routing table indicates the own node N, the IP address or the like need not to be registered.

(C) Routing Level 3

Further as shown in FIG. 2(C), among the areas thus quadrisected by the routing of the above-mentioned level 2, the area where the own exists is further quadrisected into four areas "100X", "101X", "102X", "103X" (i.e. a small node group where the node N itself belongs being further divided into plural small node groups).

In a manner similar to the above-mentioned level 1 or level 2, the respective nodes existing in an area other than the area where the own exists (an area being further divided in FIG. 2(C)) are arbitrarily selected as a representative node, and the IP address or the like of the node ID is registered in respective entries in the routing table level 3. FIG. 3(C) is an example of the routing table level 3. The IP address or the like needs not to be registered since the entry of the third column of the level 3 in the routing table because it indicates the node N itself. The entries in the second column and the fourth column are blank because no node exists in the areas (i.e. among areas further divided in FIG. 2(C), there being no node other than the node having the node ID "1000" in the area where the node N itself belongs).

In such way, the routing table is created finally up to level 4 as shown in FIG. 3(D) and the routing table covering all IDs of 8 bits is completed as the table to be memorized in the node N. Blank in the completed routing table becomes outstanding as the level increases (e.g. increasing from level 2 to level 3), as respectively shown in FIG. 3.

All nodes respectively create and memorize the routing table created according to the above-explained method (rule) (although such the routing table is created when a not-yet participating node participates in the overlay network 9, detailed explanation is omitted because it is not directly associated with the present invention).

In such way, respective nodes memorize the IP address as address information of the other node, and the area of node ID space as respectively divided node group (i.e. respective levels and respective columns of DHT) in correspondence with one another.

In other words, the respective nodes define the IP address or the like of one node belonging to respective areas (node groups) divided into plural areas, in correspondence with respective areas, as one stage (level). Further, the area where the own belongs is divided into plural areas, the IP address or the like of the one node belonging to thus respectively divided areas is defined as a next stage (level) in correspondence with respective areas in the routing table, and the routing table is memorized.

Here, a number of levels is determined in response to a number of digits of the node ID and an attention digit number of respective levels in FIG. 3(D) is determined in response to the base number. More specifically, in a case of 16 digits hexadecimal number, a node ID is 64 bits and a number of alpha-numeral of attention digits in level 16 is 0 to F. In explanation of the routing table described below, a portion indicating an attention digit number of the respective levels is also simply referred to as "column".

(ii) Storage and Search Methods of Content Data

Next, a method of storing content data acquirable in the delivery system S and a method of searching in use of the routing table are described.

In the overlay network 9, content data corresponding to various contents (e.g. movie, music, or the like) are distributed and saved (stored) in plural nodes (in other words, content data are copied and replicas of copy information are distributed and stored).

More specifically, for example, content data of a movie having a title of "XXX" are stored in nodes A and D. On the other hand, content data of another movie having a title of "YYY" are stored in nodes B and C. In such a manner, content data are distributed in plural nodes (hereinafter referred to as a "content holder") and stored. Information such as content names (title) and the above-mentioned content ID is respectively added to these content data.

On the other hand, location of the content data thus distributed and stored, in other words, the index information including a group of the IP address or the like of the node storing the content data and the content ID or the like corresponding to the content data are memorized (in an index cache) and managed by a management source node (hereinafter referred to as a "root node" or a "root node of the content (content ID)") where the content data is located. In other words, for example, the index information regarding content data of the movie having a title of XXX is managed by a node M being a root node of the content (content ID), and the index information regarding content data of the movie having a title of YYY is managed by a root node of the content (content ID).

In other words, load is distributed because the root nodes are divided with respect to every content. Further, even in a case where the same content data (same content ID) are respectively stored in plural content holders, index information of such content data can be managed by one root node. Furthermore, such the root node is set up to be, for example, a node having a node ID closest to the content ID (e.g. upper digits match more).

The node thus storing the content data (hereinafter, this node referred to as a "content holder") generates a publish (registration notification) message including the content ID of the content data, the own IP address, or the like (registration message indicative of a request for registering IP address or the like because the content data are stored) in order to notify to the root node that the content data are stored, and sends out the publish message to the root node thereof. Therefore, the publish message reaches the root node by DHT routing process by using a content ID as a key.

Next, the DHT routing process is described in detail with reference to FIG. 4. FIG. 4 is a schematic view showing an example of a flow of publish message sent from a content holder in a node ID space of DHT.

In the example of FIG. 4, for example, a node A being a content holder refers to level 1 of the rouging table of the own DHT, acquires an IP address or the like of, for example, a node H in FIG. 4 having a node ID closest to a content ID (e.g. upper digits match the most) included in the publish message, and transfers the publish message to that IP address or the like.

On the contrary thereto, the node H in FIG. 4 receives the publish message, refers to level 2 of the routing table of the own DHT, acquires an IP address or the like of, for example, a node I in FIG. 4 having a node ID closest to a content ID (e.g. upper digits match the most) included in the publish message, and transfers the publish message to that IP address or the like.

On the contrary thereto, the node I in FIG. 4 receives the publish message, refers to level 3 of the routing table of the own DHT, acquires an IP address or the like included in transfer destination node information of, for example, a node M in FIG. 4 having a node ID closest to the content ID (e.g. upper digits match the most) included in the publish message, and transfers the publish message to the IP address or the like.

On the contrary, the node M receives the publish message, refers to level 4 of the routing table of the own DHT, recognizes that the node ID closest to the content ID (e.g. upper digits match the most) included in the publish message is own, in other words, recognizes that the own is the root node of the content ID, and registers index information including a group of content ID and the IP address or the like included in the publish message (memorizing in the index cache region).

Here, the index information including the group of content ID the IP address or the like included in the publish message is also registered (cached) in nodes on a transfer route (hereinafter referred to as a "relay node"; node H and node I in the example of FIG. 4) from the content holder to the root node (the relay node thus caching index information is referred to as a "cache node").

In a case where a user of a given node wishes to acquire the desired content data, the node wishing to acquire the content data (hereinafter referred to as a "requester") sends out a content location inquiry (search) message including the content ID of content data selected from the content catalog information by the user to the other nodes according to the routing table of the own DHT. Thus the content location inquiry message routes (transferred) through several relay nodes by DHT routing using the content ID as a key and reaches the root node of the content ID, in a manner similar to the above-mentioned publish message.

The requester acquires (receives) index information of the above-mentioned content data from the root node and connects to the content holder storing the content data based on the IP address or the like, so that it is possible to acquire (download) the content data from there.

Here the requester may also acquire (receive) the IP address or the like from the relay node (cache node) caching the index information same as the root node before the content location inquiry message reaches the root node.

(III) First Embodiment

Next, the first embodiment related to the routing table of the present invention that is memorized in respective nodes N inside the above-mentioned delivery system S will be described together with the configuration of the node N itself, with reference to FIGS. 5 to 15.

Figure 5:
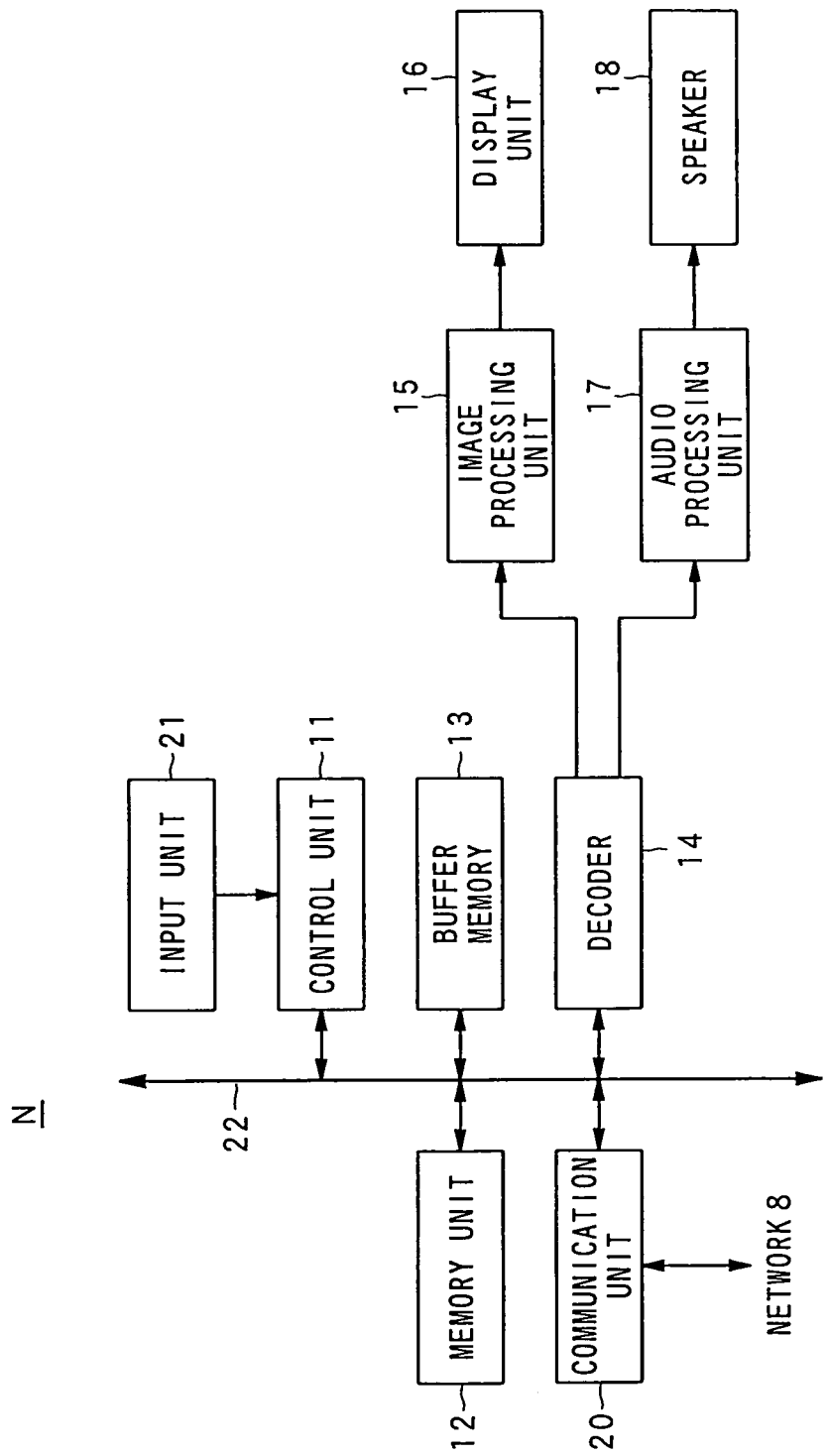
FIG. 5 is a block diagram showing schematic configuration of a node according to the first embodiment.
Figure 6:
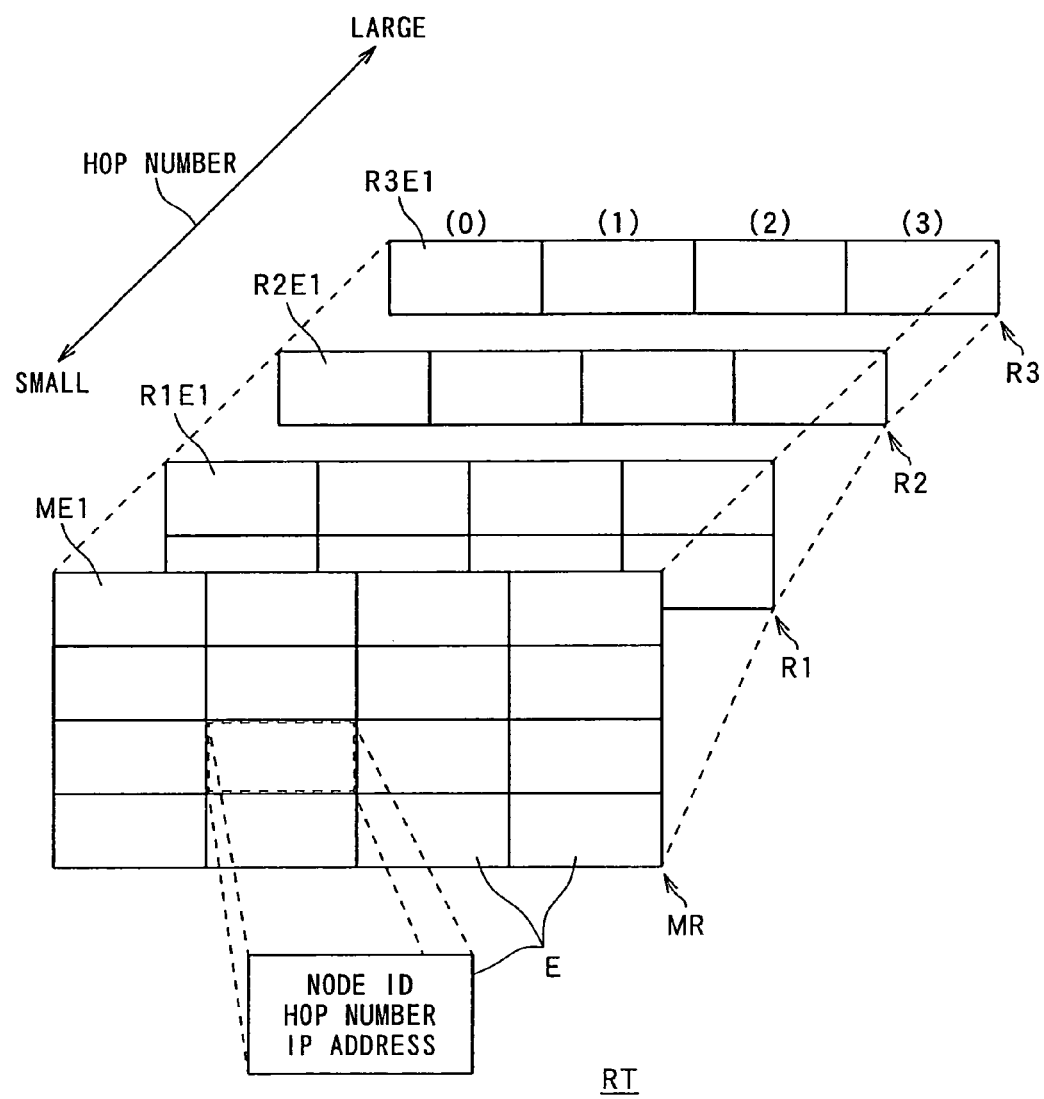
FIG. 6 is a pattern diagram (I) showing a schematic configuration of a routing table memorized in the node according to the first embodiment.
Figure 7:
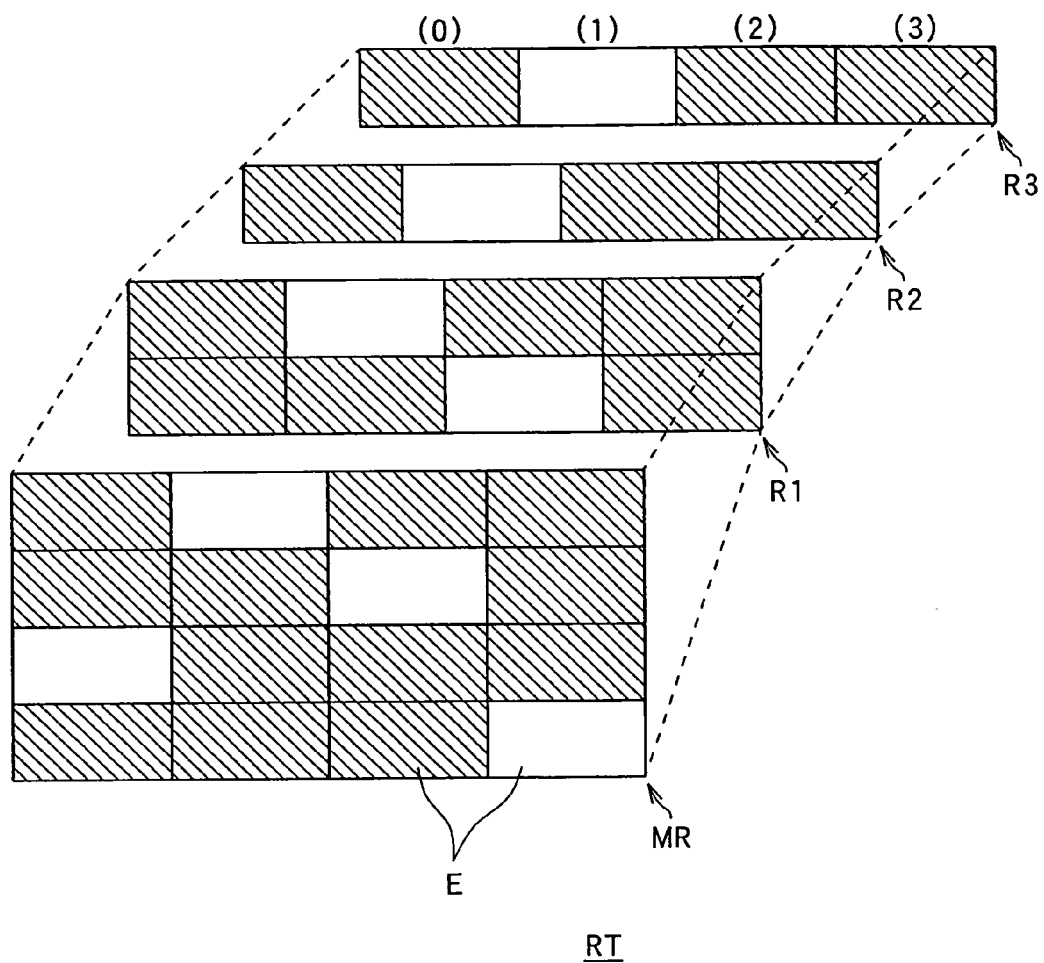
FIG. 7 is a pattern diagram (II) showing a schematic configuration of the routing table memorized in the node according to the first embodiment.

FIG. 5 is a block diagram showing a schematic configuration of a node according to a first embodiment. FIGS. 6 and 7 are schematic views showing a schematic configuration of a routing table memorized in the node. FIGS. 8 to 14 are flowcharts showing respective processes according to the embodiment with respect to the routing table. FIG. 15 is a view exemplifying an update process of the routing table.

First, schematic configuration and overall operation of the node according to the first embodiment will be described with reference to FIG. 5. Here in the respective embodiments, basically, the above-mentioned content holder, requester, root node, and the other nodes N all have the same hardware. Configuration of an ordinary node N as a representative is schematically explained with reference to FIG. 5.

A node N included in a delivery system S according to the first embodiment are configured by including, as shown in FIG. 5, a control unit 11 as a reference means, a delete means, and an order change means configured by a CPU having computing function, a RAM (Random Access Memory) for work, a ROM (Read Only Memory) for recording various data and programs, or the like; a memory unit 12, as a node identification information memory means, configured by an HDD or the like for recording and storing content data as the above-mentioned content itself, the above-mentioned routing table, the other necessary program, or the like; a buffer memory 13 for temporarily storing the received content data; a decoder 14 for decoding (stretching data or the like) the encoded video data (image information) and audio data (audio information) included in the content data; an image processing unit 15 for providing a predetermined graphic process to video data or the like thus decoded and outputting the data as a video signal; a display unit 16 such as CRT (Cathode Ray Tube) or liquid crystal display for displaying image based on the video signal outputted from the image processing unit 15; an audio processing unit 17 for converting the thus decoded audio data into an analog audio signal in use of digital/analog (D/A) conversion, amplifying thus converted signal by an amplifier and outputting the same; a speaker 18 for outputting the audio signal thus outputted from the audio processing unit 17 as acoustic wave; a communication unit 20 for carrying out communication control of information with other node N via the network 8; and an input unit (e.g. a keyboard, a mouse, or an operation panel) 21 for receiving instruction from respective users and providing the instruction signal corresponding to the instruction to the control unit 11, wherein the control unit 11, the memory unit 12, the buffer memory 13, the decoder 14, and the communication unit 20 are connected to each other via a bus 22 in such manner that data are mutually transferable among them.

When CPU in the control unit 11 executes various programs recorded in the memory unit 12 or the like, the control unit 11 overall controls entire operations as any one of the requester, the root node, the content holder and the other ordinary nodes N.

Next, configurations and processes corresponding thereto of the routing table according to the first embodiment including basic common operations as ordinary node (including root node, content holder, and requester) will be described respectively.

Here, in the explanation below, a size of the routing table is from level 1 to level 4 (i.e. an 8-bit compliant routing table similar to the one shown in FIG. 3(D)) and one level is divided into four.

As shown in FIG. 6, the routing table RT according to the first embodiment memorized in the above-mentioned memory unit 12 is configured by main tables MR mainly used for the above-mentioned DHT routing process and sub-tables R1 to R3 sequentially used as an alternative to the main table MR.

In this configuration, the main table MR includes sixteen entries E in total of four levels from level 1 to level 4 (4 levels×4 areas). The sub-table R1 includes eight entries E in total of two levels from level 1 to level 2 (2 levels×4 areas). Further, the sub-tables R2 and R3 respectively include four entries E only for level 1 (1 level×4 areas). In other words, as the rooting table, a number of levels in respective tables exponentially decreases with respect to the main table MR.

In respective entries E, in addition to the node ID and IP address or the like indicative of the node N of the routing destination (transfer destination) of the corresponding level, a number of hops being the number of nodes relayed until the messages or the like reach the node of the routing destination is described as information indicative of a distance, on the network, to the node of the routing destination (in other words, easiness in making message or the like reach the node of the routing destination). Here as described above, in one routing table, the entries E becoming blank increase as the level increases. Hereinafter, the node ID, the IP address or the like, and hop numbers, as a whole, are refereed to as "node information".

Here, in the memory unit 12 according to the first embodiment, a memory region capable of memorizing all tables from the main table MR to the sub-tables R3 as shown in FIG. 6 is always secured as a memory region for the routing table RT (regardless of whether the node information is actually memorized in respective entries E).

Here, specifically as a memory region for the routing table RT, the memory region needs not to be secured because node information needs not to be described in the entry E corresponding to the own node ID. Because it is set up as one level×{(4 areas)−(area (one) corresponding to the own node ID)}=12, for example, in a case where four entries E can be memorized in the level 1 in the routing table RT, it may be enough that a memory region enough for twelve entries in total is secured, regardless whether or not node information is memorized in the entry E. In other words, as exemplified in FIG. 7, in a case where the own node ID is for example "1203", there exists no node information to be registered in one line (level 1), column 2. Therefore, a memory region to be secured as a level 1 is a memory region for three entries indicated by lower right hatching in FIG. 7. At the same time, in a case of FIG. 7, a memory region enough for six entries in total may be sufficient since two entries E can be possessed as a level 2, and a memory region enough for three entries in total may be sufficient since one entry E can be possessed as a level 4.

Next, in the main table MR and the sub-tables R1 to R3 forming the routing table RT according to the first embodiment, node information of the node to be a transfer destination which belongs to the same area (the same node group) is described by a node respectively in the order from the small hop number, to the main table MR, and respectively sub-tables R1 to R3 in the entry E corresponding to the same level and the same area in respective tables.

More specifically, in a case of the entry ME1 of the main table MR exemplified in, for example, FIG. 6 is paid attention, node information indicative of another node belonging to the same area as the node indicated by the node information described in the entry ME1 is respectively described in the sub-table R1 entry R1E1, the sub-table R2 entry R2E1, and the sub-table R3 entry R3E1 which are corresponding to the same level and the same area as the entry ME1.

The number of hops up to the node indicated by the node ID described in the main table MR entry ME1 is smaller than the number of hops up to the node indicated by the node ID described in the sub-table R1 entry R1E1. The number of hops up to the node indicated by the node ID described in the entry R1E1 is smaller than the number of hops up to the node indicated by the node ID described in the sub-table R2 entry R2E1. Further, the number of hops up to the node indicated by the node ID described in the entry R2E1 is smaller than the number of hops up to the node indicated by the node ID described in the sub-table R3 entry R3E1.

Here, in the routing table RT shown in FIG. 6, the number of hops up to the node indicated by the node ID described in respective entries ME1, R1E1, R2E1, and R3E1 may be set up to be equal. In this case, the node ID indicating the node receiving the message latest from the other node is described in the entry ME1.

During a DHT routing process using the routing table RT having such the configuration, in a case where it is recognized that the node indicated by the node ID described, for example, in the main table MR entry ME1 does not exist in the delivery system S any longer for reasons such as the withdrawal of the node itself from the delivery system S, the other node N (in the same area) indicated by the node information described in the sub-table R1 entry R1E1 is immediately changed to a new routing destination and the necessary DHT routing process is continued.

After the DHT routing process of the other node as a routing destination, an update process of the routing table RT is carried out, wherein the node information originally described in the entry R1E1 is rewritten in the entry ME1, the node information originally described in the entry R2E1 is rewritten in the entry R1E1, and further, the node information originally described in the entry R3E1 is rewritten in the entry R2E1, and a new DHT routing process is prepared.

Further, when the other node having the smaller hop number than that of the node indicated by the node ID described for example in the current entry ME1 is discovered in an identical level and an identical area, node information indicative of the newly discovered node is newly described in the entry ME1, and an updating process of the routing table RT is carried out, wherein the node information originally described in the entry ME1 is rewritten in the entry R1E1, and the node information originally described in the entry R1E1 is rewritten in the entry R2E1, and further the node information originally described in the entry R2E1 is rewritten in the entry R3E1, and new DHT routing process is prepared.

In a case of FIG. 6, although the main table MR covers up to level 4, the sub-table R1 covers only up to level 2, and the sub-tables R2 and R3 cover only up to level 1. This is because there exists only one piece of node information to be described in the lowest digit in the main table MR included in the routing table RT, as exemplified in FIG. 3(D). Therefore in the first embodiment, it is impossible that the node information is described in the column corresponding to the level 4 in the sub-tables R1 to R3.

Further, although the number of tables itself included in the routing table RT according to the first embodiment ("4" in a case of FIG. 6) can be arbitrarily determined by means of, for example, other experimental method or the like, more specifically, it is desirable to determine based on, for example, statistical node withdrawal rate in the delivery system S.

Next, the above-mentioned updating process related to the routing table RT according to the first embodiment is specifically described with reference to FIGS. 8 to 15. Here, processes corresponding to respective flowcharts in FIGS. 8 to 15 are carried out by the control unit 11 in respective nodes N.

First, the ordinary process of the node N according to the first embodiment is explained with reference to FIG. 8(a). Here FIG. 8(a) is a flowchart showing the ordinary process.

Figure 8A:
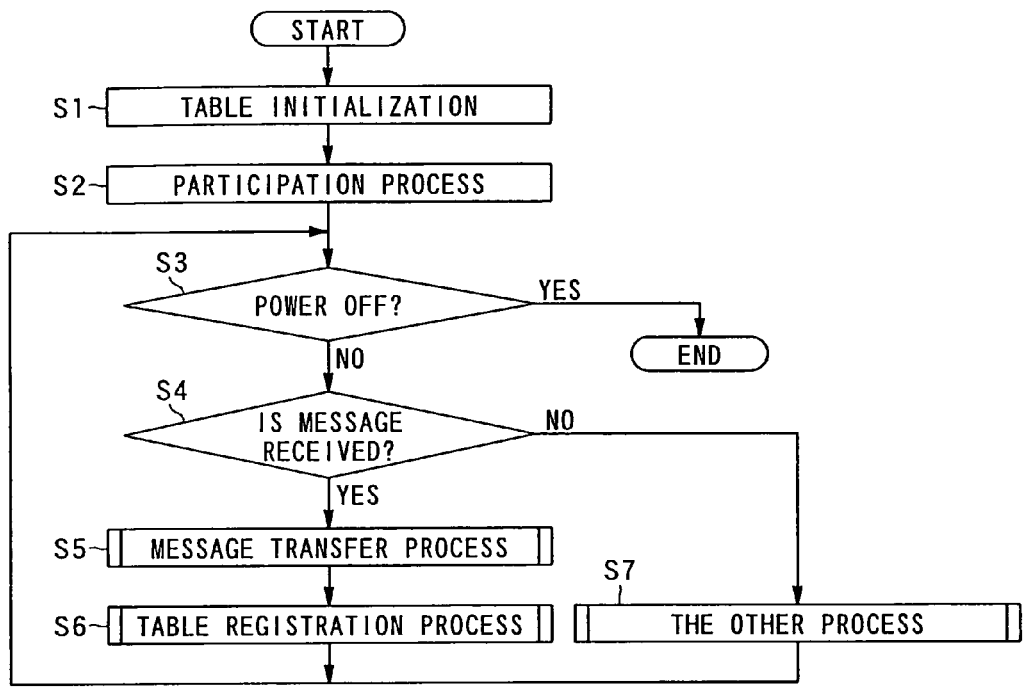
FIG. 8 is a flowchart (I) showing a process for a routing table memorized in the node according to the first embodiment. (a) is a flowchart showing an ordinary process and (b) is a flowchart showing a message transfer process.

In the node N according to the first embodiment as shown in FIG. 8(a), with new participation in the delivery system S, information of all the node IDs or the like described in respective entries E in the routing table RT memorized by the own is initialized (Step S1). Further, the above-mentioned participation request message is sent to participate in the delivery system S (Step S2).

After the participation, it is consistently monitored whether or not the own power is switched off (Step S3). When it is turned off (Step S3: YES), the process is finished. On the other hand, when it is not turned off (Step S3: NO), it is confirmed whether or not any message is received from the other node N (Step S4).

When any message is received from the other node N (Step S4: YES), a message transfer process, which is described later, including searching in the main table MR a transfer destination where the received message is transferred is carried out (Step S5). Further, a process of newly registering node information in a routing table RT using the result of the message transfer process is carried out (Step S6). Then the process returns to Step S3, and the process is repeated. Here, processes of Steps S5 and S6 are described in detail later.

On the other hand, in the judgment of Step S4, when any message is not received (Step S4: NO), the other process preset as the node N is carried out (Step S7). Then the process returns to Step S3 and the above-mentioned process is repeated.

Figure 8B:
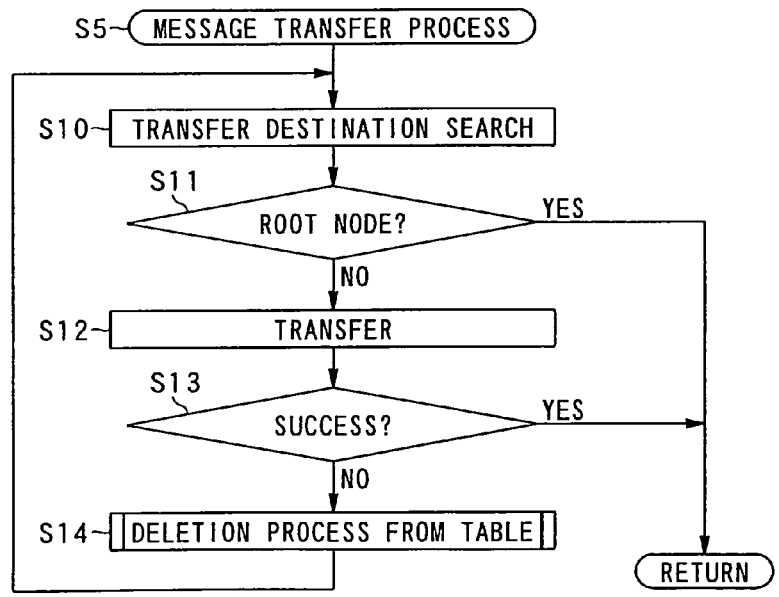

Next, the message transfer process as the above Step S5 is described specifically using FIG. 8(b). Here, FIG. 8(b) is a flowchart showing a message transfer process.

As shown in FIG. 8(b) as the message transfer process, in a case where any message is received (Vide Step S4: YES in FIG. 8(a)), at first an entry to be a next transfer destination is searched in the main table MR memorized by the own (Step S10).

It is confirmed whether or not the own node is proved to be the root node (Step S11) during the search process. When the own node is the root node (Step S11: YES), a process in response to the message is carried out because the node N of the transfer destination does not exist any longer. Then the process goes to Step S6.

On the other hand, in the judgment of Step S11, when the own node is not the root node but the node N to be transferred next is searched (Step S11: NO), the message thus received is transferred using the search result (Step S12), and it is confirmed whether or not the transfer succeeds (Step S13). More specifically, for example as a process of Step S13, it can be confirmed by presence of response message from the transfer destination node N.

In the confirmation of Step S13, when the transfer succeeds (Step S13: YES), the process goes to Step S6. On the other hand, when the transfer fails because the transfer destination node N withdraws from the delivery system S (Step S13: NO), the node information indicative of the transfer destination node N where the transfer from the current main table MR fails is deleted (Step S14). Then the process returns to the above-mentioned Step S10 and a next transfer destination node is searched again in the main table MR after the deletion process (Step S14).

Here, as described later, in the deletion process in the above-mentioned Step S14, node information of the node where the message transfer fails is deleted from the main table MR and then, node information described in the entry E of the sub-table R1 corresponding to the same level and the same area as the entry E is described in the entry E of the main table MR having the deleted node information described. Therefore, as the result of repetition of the processes of the above-mentioned Steps S14 and S10, the entry E corresponding to the same level and the same area is sequentially referred to in order of main table MR, sub-table R1, sub-table R2, to sub-table R3 as shown in FIG. 6, and it is provided in the message transfer process.

Next, the message deletion process as the above-mentioned Step S14 is specifically described with reference to FIG. 9(a). Here, FIG. 9(a) is a flowchart showing the message deletion process.

Figure 9A:
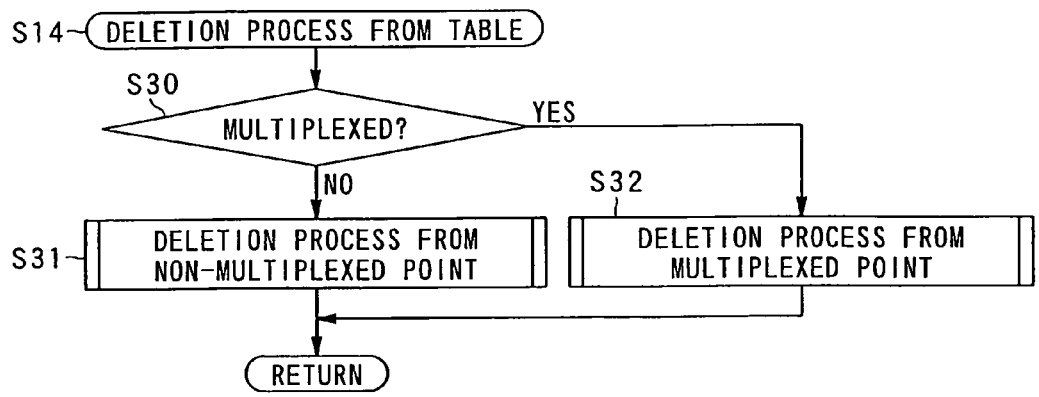
FIG. 9 is a flowchart (II) showing a process for the routing table memorized in the node according to the first embodiment, wherein (a) is a flowchart showing a process of deleting from the table and (b) is a flowchart showing a process of deleting from a non-multiplexed point.

As shown in FIG. 9(a), as the message deletion process, first, it is confirmed whether or not the entry E of the main table MR describing node information of the node where the message transfer fails has the entry E of the sub-table R1 corresponding to the same level and the same area as the entry E (Step S30).

Here, in the below explanation, the entry E of the main table MR where the entry E corresponding to the same level and the same area exists at least in the sub-table R1 is referred to as "multiplexed entry" hereinafter. More specifically explained with reference to FIG. 6, in the main table MR according to the first embodiment, the level 1 and the level 2 are multiplexed entries and the level 3 and level 4 are not multiplexed entries.

In a case where the entry E of the main table MR where node information of the node where the message transfer fails is described is a multiplexed entry (Step S30: YES), the node information is deleted from the entry E of the main table MR that is multiplexed (Step S32), and the process goes to the process of Step S10 in FIG. 8(b).

On the other hand, in the judgment of Step S30, in a case where the entry E of the main table MR where the node information of the node where the message transfer fails is described is not a multiplexed entry (Step S30: NO), the node information is deleted from the entry E of the main table MR that is not multiplexed (Step S31). Then the process goes to the process of Step S10 in FIG. 8(b).

Next, the process of above-mentioned Step S31 is specifically explained with reference to FIG. 9(b). Here, FIG. 9(b) is a flowchart showing the deletion process of Step S31.

Figure 9B:
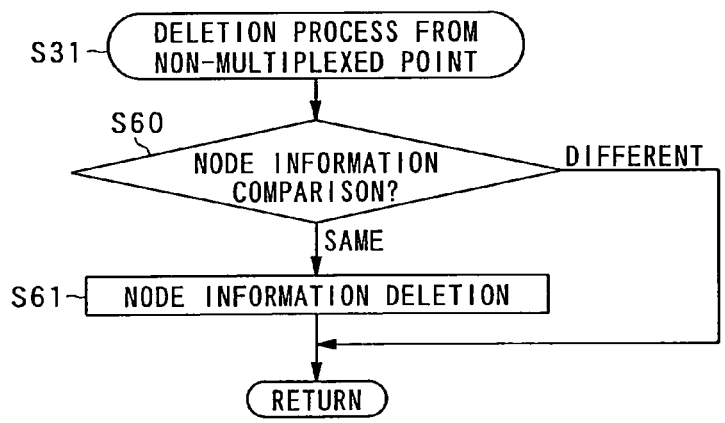

In the deletion process of Step S31 as shown in FIG. 9(b), comparison is first made between node information of the node where the message transfer fails and node information actually described in the entry E of the main table MR having the node information to be described (Step S60). In a case where the both are the same (Step S60: same), the node information actually described in the entry E is deleted (Step S61). Then the process goes to the process of Step S10 in FIG. 8(b).

On the other hand, in the judgment of Step S60, in a case where the both are different, for example, because of error in the transfer success judgment process, it is regarded as necessary that the transfer process using the same node information is carried out again (Step S60: different). Then the process goes to the process of Step S10 in FIG. 8(b) without deleting the node information actually described in the entry E.

Next, the process of the above-mentioned Step S32 is specifically explained with reference to FIG. 10. Here, FIG. 10(a) is a flowchart showing the deletion process of Step S32, and FIG. 10(b) is a schematic diagram showing a state of the deletion process.

Figure 10A:
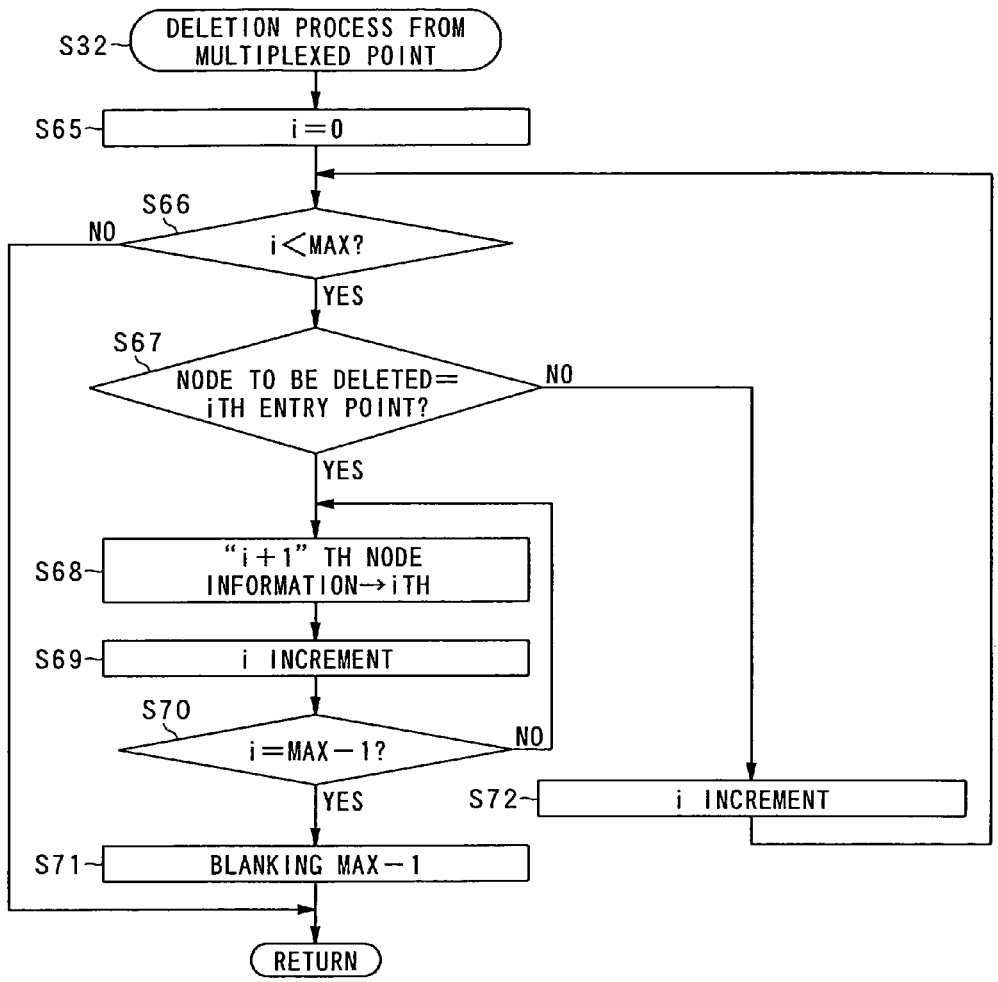
FIG. 10 is a flowchart or the like showing a process for the routing table memorized in the node according to the first embodiment, wherein (a) is a flowchart showing a process of deleting from a multiplexed point, and (b) is a conceptual view thereof.
Figure 10B:
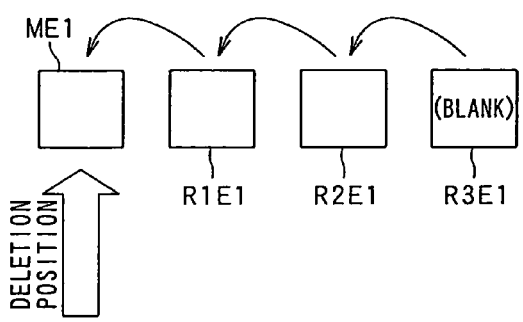

As shown in FIG. 10(a), as the deletion process in Step S32, a parameter i indicative of the number of respective tables in the order of reference in the routing table RT is initialized (Step S65). With respect to the parameter i shown in FIG. 6, the main table MR is corresponding to a parameter i="0", the sub-table R1 is corresponding to a parameter i="1", and the sub-table R2 is corresponding to a parameter i="2".

When the parameter i is initialized, next it is confirmed whether or not a value of the current parameter i is less than a parameter MAX (the value being "3" in a case of FIG. 6) indicative of a multiplexing number in the routing table RT (Step S66). In a case where the value of the current parameter i is not less than the value of the parameter MAX (Step S66: NO), there exists no lower sub-table further to be referred to. Therefore, the process goes to the process of Step S10 in FIG. 8(b).

On the other hand, in the judgment of Step S66, when the value of the current parameter i is less than the value of the parameter MAX (Step S66: YES), next it is confirmed whether or not the entry E with the node information to be deleted is the entry E in the table indicated by the current parameter i (Step S67). When the entry E having the node information to be deleted is not the entry E in the table indicated by the current parameter i (Step S67: NO), the value of the current parameter i is incremented by "1" (Step S72), and the process returns to the process of the above-mentioned Step S66.

Here, the entry E of the main table MR is not uniformly deleted but the entry E subject to be deleted is searched by loop process, including the other sub-tables R1 to R3. This is because new entry E may be registered in the main table MR during the message transfer process, and therefore the entry E of the main table MR is not necessarily deleted.

On the other hand, in the judgment of Step S67, when the entry E having the node information to be deleted is the entry E in the table indicated by the current parameter i (Step S67: YES), next the node information to be deleted (the node information to be deleted that is described in the entry E of the table indicated by the value of the current parameter i) is rewritten using the node information described in the entry E of the same level and the same area in the table located one lower (i.e. raising the node information between tables; Step S68), and the value of the current parameter i is incremented by "1" (Step S69).

It is confirmed whether or not the value of the parameter i after the increment becomes the value where "1" is reduced from the value of the parameter MAX (Step S70). When it is not the value (Step S70: NO), the process returns to the process of Step S68 to repeat the raising of the node information between the above-mentioned tables with respect to the lower table. On the other hand, the value of parameter i after the increment becomes the value where "1" is reduced from the value of the parameter MAX (Step S70: YES), the node information in the appropriate entry E of the table indicated by the then parameter i (=MAX−1) is deleted (Step S71). Then the process goes to the process of Step S10 in FIG. 8(b).

After carrying out the above-explained process shown in FIG. 10(a), the node information described in the entry ME1 of the main table MR is deleted as exemplified in FIG. 10(b) and further by reference numerals "A" to "C" in FIG. 15. In such case, the node information described in the entry R1E1 of the sub-table R1 is described in the entry ME1, the node information described in the entry R2E1 of the sub-table R2 is described in the entry R1E1 in the sub-table R1, and the node information described in the entry R3E1 of the sub-table R3 is described in the entry R2E1 of the sub-table R2, and further the node information described in the entry R3E1 of the sub-table R3 is deleted, so that the entry R3E1 is blank.

Next, the table registration process as the above-mentioned Step S6 is specifically explained with reference to FIG. 11. Here, FIG. 11 is a flowchart showing the registration process.

Figure 11:
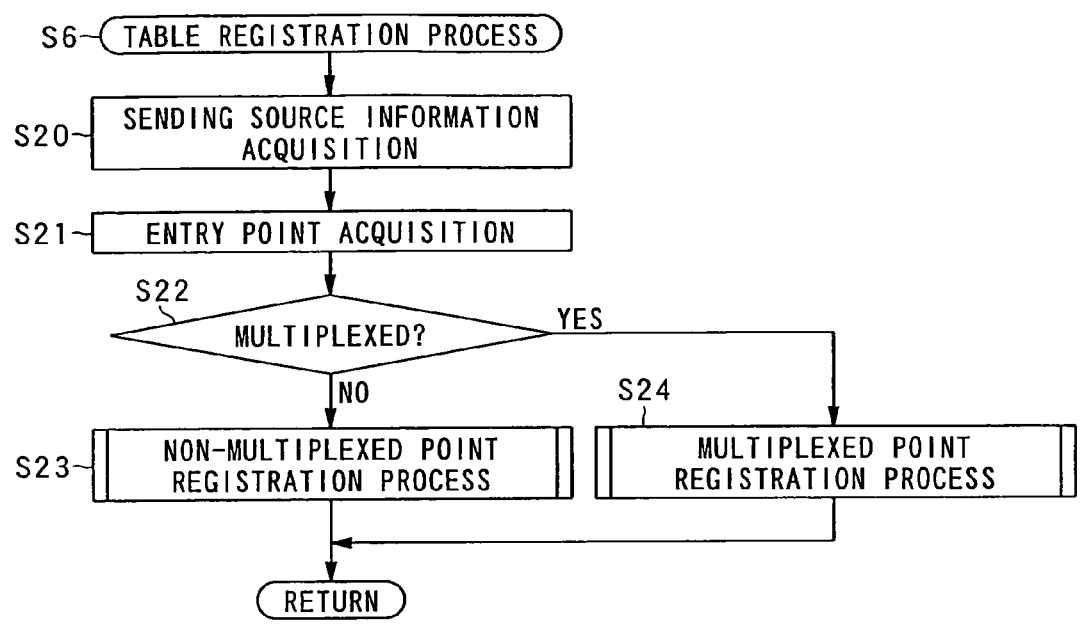
FIG. 11 is a flowchart showing a process of registering in the routing table memorized in the node according to the first embodiment.

In the registration process as shown in FIG. 11, the node information indicative of the node of the sending source of the message received in the process of Step S4 in FIG. 8(a) is acquired (Step S20), and it is confirmed which one the entry E of the main table MR to describe the node information based on the node information thus acquired (Step S21).

Next, it is confirmed whether or not the entry E thus confirmed is a multiplexed entry (Step S22). When it is multiplexed (Step S22: YES), new node information is described with respect to the entry E of the multiplexed main table MR (Step S24). Then the process goes to the process of Step S3 in the above-mentioned FIG. 8(a).

On the other hand, in the judgment of Step S22, when thus confirmed entry E is not a multiplexed entry (Step S22: NO), new node information is described for the entry E of the main table MR not multiplexed (Step S23). Then the process goes to the process of Step S3 in the above-mentioned FIG. 8(a).

Next, the registration process in the above-mentioned Step S23 is specifically explained with reference to FIG. 12(a). Here, FIG. 12(a) is a flowchart showing the registration process of Step S23.

Figure 12A:
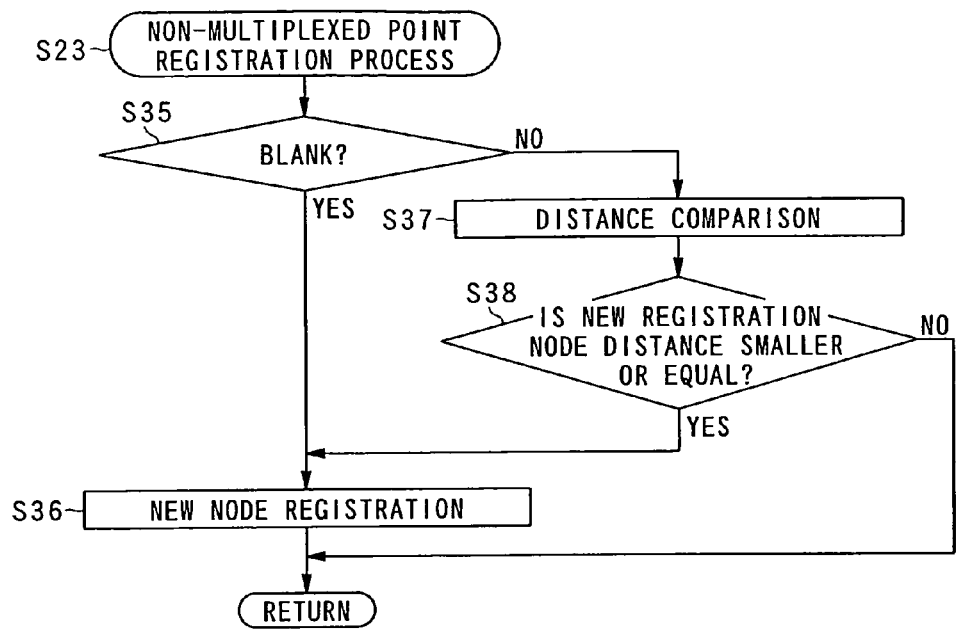
FIG. 12 is a flowchart (III) showing a process for the routing table memorized in the node according to the first embodiment, wherein (a) is a flowchart showing a process of registering in the non-multiplexed point, (b) is a flowchart showing a process of registering in the multiplexed point.

In the registration process of Step S23 as shown in FIG. 12(a), it is first confirmed whether or not the entry E of the subject main table MR is blank, where the node information is not described (Step S35). When the entry E of the main table MR is blank (Step S35: YES), new node information is described in the entry E as it is (Step S36). Then the process goes to the process of Step S3 in FIG. 8(a).

On the other hand, in the judgment of Step S35, when the node information is already described in the entry E of the main table MR (Step S35: NO), comparison is made between the hop number in thus described node information and the hop number in the node information to be newly described (Steps S37 and S38). When the hop number in the node information to be newly described is same or smaller as or than the hop number in the already described node information (Step S38: YES), the already described node information is rewritten using the new node information (Step S36), and the process goes to the process of Step S3 in FIG. 8(a).

On the other hand, in the judgment of Step S38, when the hop number in the node information to be newly described is larger than the hop number in the already described node information (Step S38: NO), it is regarded as the already described node information is continued to use. Then the process goes to the process of the above-mentioned Step FIG. 8(a) as-is.

Next, the registration process in the above-mentioned Step S24 is specifically described with reference to FIG. 12(b). Here, FIG. 12(b) is a flowchart showing the registration process of Step S24.

Figure 12B:
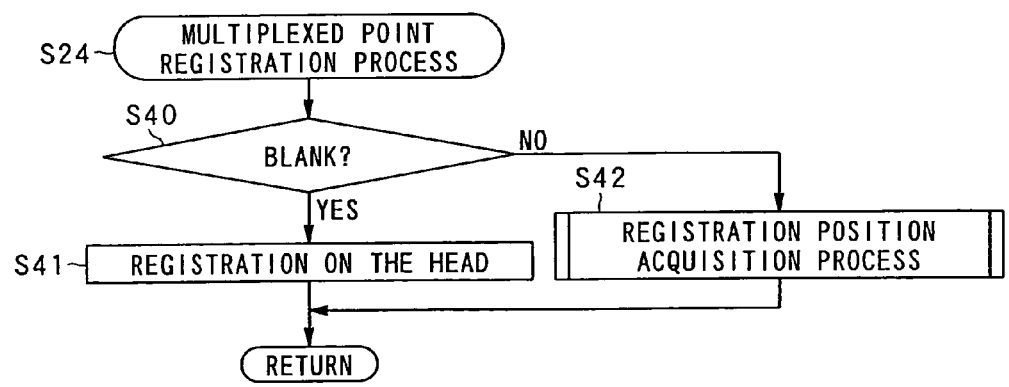

In the registration process of Step S24 as shown in FIG. 12(b), first, it is confirmed whether or not the entry E of the subject main table MR is blank in a similar process to the process of Step S35 (Step S40). When the entry E of the main table MR is blank (Step S40: YES), new node information is described in the entry E (Step S41) as-is. Then the process goes to the process of Step S3 in FIG. 8(a).

On the other hand, in the judgment of Step S40, when the node information is described in the entry E of the main table MR (Step S40: NO), next a registration location acquisition process of acquiring a table that has the node information to be newly described next is carried out (Step S42). Then the process goes to the process of the above-mentioned Step S3 in FIG. 8(a).

Next, the acquisition process of the above-mentioned Step S24 is specifically explained with reference to FIG. 13. Here, FIG. 13 is a flowchart showing the acquisition process of Step S42.

Figure 13:
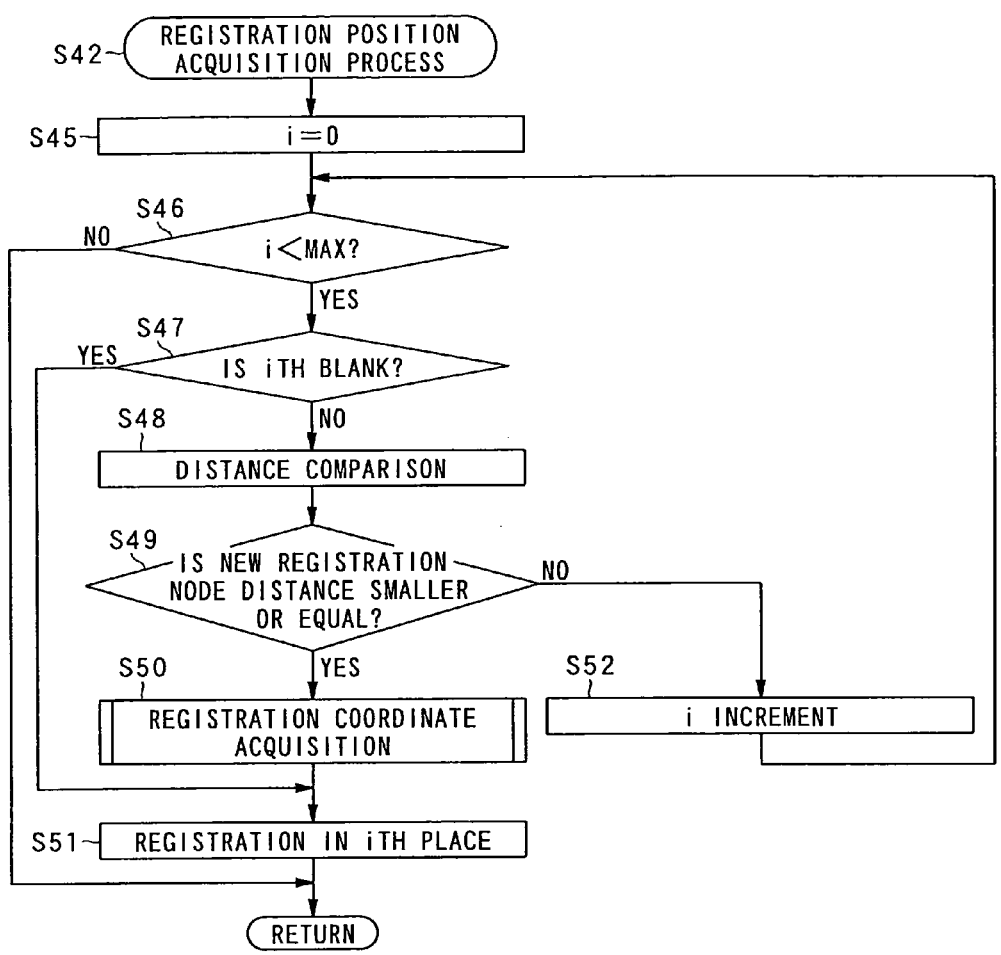
FIG. 13 is a flowchart showing a process of acquiring a registration location in the routing table memorized in the node according to the first embodiment.

In the acquisition process of Step S42 as shown in FIG. 13, the above-mentioned parameter i is first initialized (Step S45), and it is confirmed whether or not a value of the current parameter i is less than the above-mentioned parameter MAX (Step S46). When a value of the current parameter i is not less than a value of the parameter MAX (Step S46: NO), the process goes to the process of Step S3 in FIG. 8(a) because the lower sub-table further to be referred to does not exist.

On the other hand, in the judgment of Step S46, when the value of the current parameter i is less than the value of the parameter MAX (Step S46: YES), it is confirmed whether or not the entry E, which is in the table indicated by the current parameter i and in the level and the area which has new node information to be registered, is in a blank state without having node information currently described (Step S47).

When the entry E is blank (Step S47: YES), the new node information is described in the entry E in the table indicated by the parameter i (Step S51). Then the process goes to the process of Step S3 in FIG. 8(a).

On the other hand, in the judgment of Step S47, when the entry E is not blank (Step S47: NO), comparison is made between the hop number in thus described node information and the hop number in the node information to be newly described (Steps S48 and S49). When the hop number in the node information to be newly described is the same as or smaller than the hop number in the node information already described (Step S49: YES), an acquisition process, described later, of acquiring the entry E in the table having the new node information described is carried out (Step S50). The new node information is described in thus acquired entry E (Step S51). Then the process goes to the process of Step S3 in FIG. 8(a).

Further, in the judgment of Step S49, when the hop number in the node information to be newly described is larger than the hop number in the node information already described (Step S49: NO), the value of the current parameter i is incremented by "1" (Step S52). Then the process returns to the process of Step S46.

Next, the acquisition process in the above-mentioned Step S50 is specifically explained with reference to FIG. 14. Here, FIG. 14(a) is a flowchart showing the acquisition process of Step S50, and FIG. 14(b) is a schematic diagram showing a state of the acquisition process.

Figure 14A:
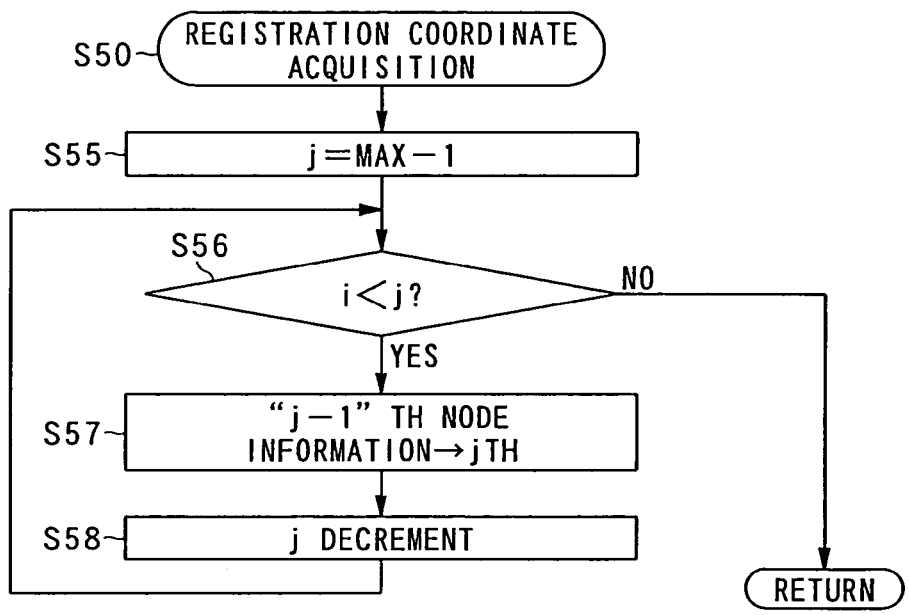
FIG. 14 is a flowchart or the like showing a process for the routing table memorized in the node according to the first embodiment, wherein (a) is a flowchart showing a process of acquiring a registration coordinate, and (b) is a conceptual view thereof.
Figure 14B:
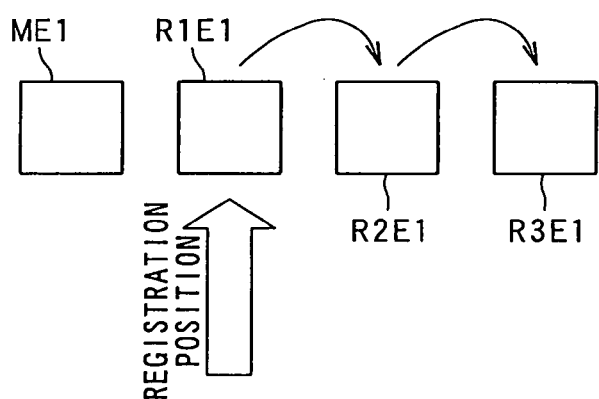
Figure 15:
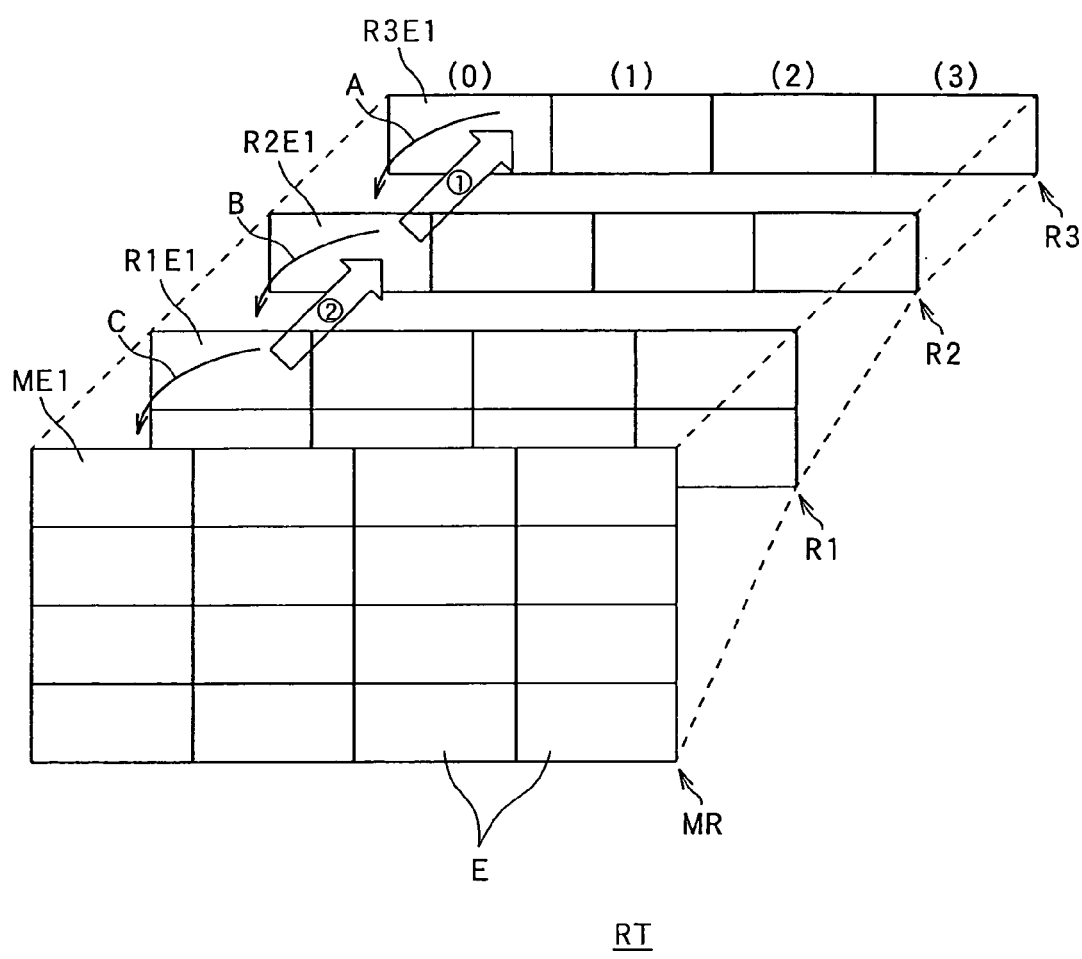
FIG. 15 is a pattern diagram showing a process of updating the routing table memorized in the node according to the first embodiment.

The acquisition process of Step S50 is that, as shown in FIG. 14(a), the parameter j indicative of the number of respective tables in the order of reference in the routing table RT is set up as a value of (parameter MAX−1) in a manner similar to the above-mentioned parameter i (Step S55), and next comparison is made between a value of the current parameter i and a value of the current parameter j (Step S56).

When the value of the current parameter i is less than the value of the current parameter j (Step S56: YES), the content of the entry E of the same level and the same area in the table indicated by the value of the current parameter j is rewritten by using the node information described in the entry E of the same level and the same area in the table (j—first table) that is located in one upper rank than the table indicated by the value of the current parameter j (i.e. lowering of node information between tables; Step S57), and the value of the current parameter j is decremented by "1" (Step S58). Then the process returns to the process of Step S56.

On the other hand, in the judgment of Step S56, when the value of the current parameter i is not smaller than the value of the current parameter j (Step S56; NO), the process goes to the process of Step S51 of FIG. 13.

After the processes thus explained are carried out as in FIGS. 13 and 14(a), the case shown in FIG. 6 is exemplified in FIG. 14(b) and further exemplified by using "Number 1 in circle" arrow mark and "Number 2 in circle" arrow mark in FIG. 15. In a case where the node information described in the entry R1E1 of the sub-table R1 is rewritten by new node information, the node information described in the entry R1E1 of the sub-table R1 until then is moved to the entry R2E1 of the sub-table R2 (the existing node information of the entry R2E1 being rewritten), further the node information described in the entry R2E1 of the sub-table R2 until then is moved to the entry R3E1 of the sub-table R3 (the existing node information of the entry R3E1 being rewritten), and the new node information is described in the blank entry R1E1.

As respectively explained, according to the process related to the routing table RT of the first embodiment, plural tables are memorized in the routing table RT, the node information arranged respectively in the same location in the matrix of the respective tables is sequentially referred to in the order of reference and used for transfer of messages or the like. Therefore, because plural pieces of the node information available in the transfer process as substitute are previously memorized, even in a case where the node N being an existing transfer destination withdraws from the delivery system S, it is possible to promptly discover substitute node information and to carry out the transfer process efficiently and promptly.

Therefore, it is possible to transmit the transfer process efficiently and promptly, and it is also possible to increase fault tolerance as the delivery system S and contribute to improvement of transmission efficiency because the routing table RT flexibly changes with respect to a node N withdrawal from the delivery system S.

Further, respective levels of the respective tables correspond with respective hierarchy levels of the node group in the delivery system S to which the node N belongs, and further a number of the sub-table R1 or R2 is smaller than that of the main table MR which should be first referred to, whereby the node information can efficiently be referred to in accordance with respective node groups and a memory capacity as the memory unit 12 can be saved at the same time.

Further, because respective levels from the highest level are sequentially corresponded with respective hierarchy levels of the node group from the highest hierarchy levels, it is possible to efficiently acquire the node information as substitute in correspondence with the hierarchy structure of the node group in the delivery system S.

Further, because in the respective tables, levels sequentially decrease from the lower level as the reference order becomes lower, it is simultaneously possible to realize an efficient acquisition of the node information as alternative and to save a memory capacity of the memory unit 12.

Further, in the respective tables forming the routing table RT, because the respective tables are configured in such manner that the number of levels exponentially decreases in the reference order, it is possible to realize the routing table RT having the necessity minimum configuration in response to the changing number of the node devices participating in the delivery system S.

Further, because the number of tables memorized in the routing table RT is determined in response to the number of node N withdrawal from the delivery system S, it is possible to save memory capacity of the memory unit 12 by setting the number of tables in one node N as the necessity minimum.

Further, when the node information referred to is incapable of use for the transfer process in a case where the node information of the main table MR is referred to, the other node information arranged in the same location in the reference order as the node information incapable of use in the matrix in the sub-table R1 is referred to and used for the transfer process, it is possible to promptly discover the node information to be referred to next and give and receive the information.

Further, in a case where there exists the node information incapable of use for the transfer process, it is deleted from the main table MR and the node information located lower in the reference order is moved up to complement the main table MR. Therefore, it is possible to efficiently maintain the transfer process even in a case where there exists the node information incapable of use for the transfer process.

Further, when there exists the node information to be newly arranged in any table, the node information is arranged in a corresponding table in the reference order, and the node information located in the new arrangement location is rearranged in the location corresponding to the other table located behind in the reference order. Therefore, it is possible to arrange the new node information and efficiently give and receive the information, and it is possible to rearrange and utilize the node information arranged until then.

(IV) Second Embodiment

Next, the second embodiment being the other embodiment of the routing table related to the present invention will be explained with reference to FIG. 16. Here, FIG. 16 is a pattern diagram showing a schematic configuration of a routing table memorized in a node according to a second embodiment schematic diagram showing schematic configuration.

Further in the routing table related to the second embodiment, similar numerical references are used for construction elements similar to the routing table RT related to the first embodiment, and detailed explanation is omitted.

In the above-mentioned first embodiment, with respect to the level number of the sub-tables R1 to R3 other than the main table MR (the number of levels of the sub-table itself), it is configured to decrease the number exponentially toward the sub-tables from R1 to R3. However, as the second embodiment explained below, it may be the same level number among these sub-tables.

Figure 16:
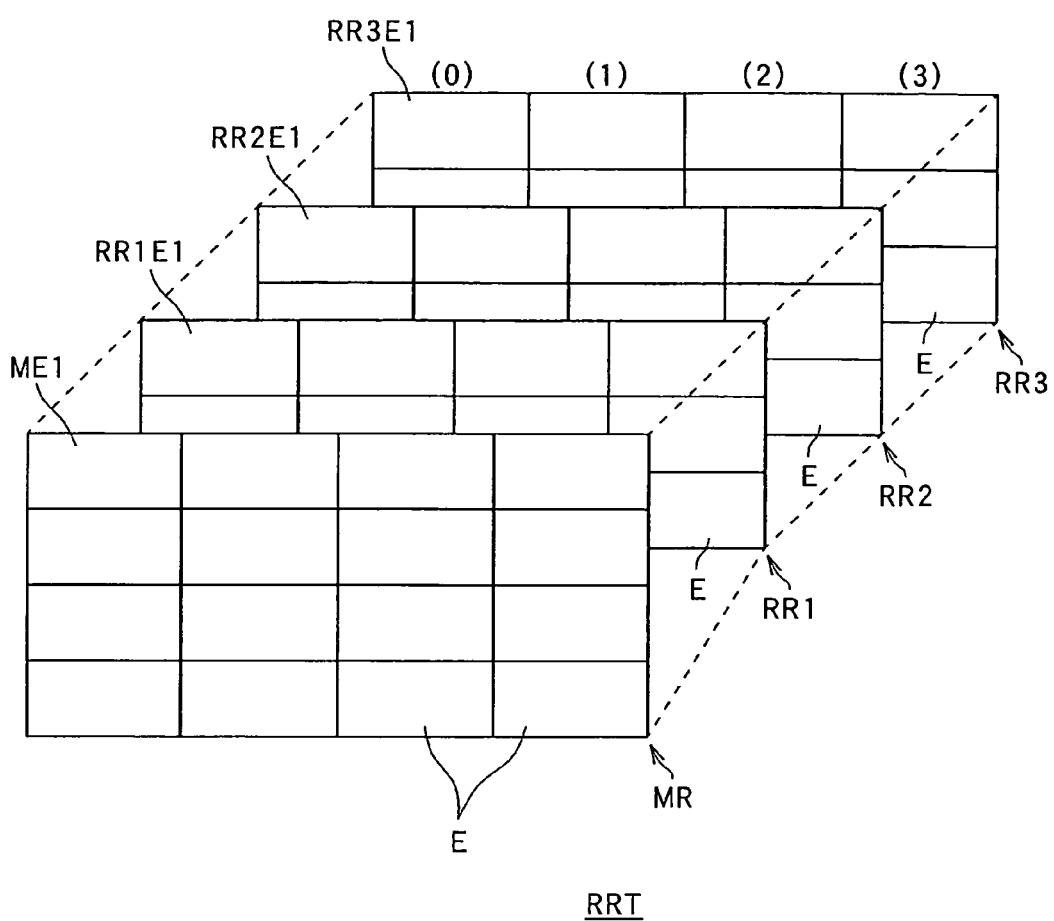
FIG. 16 is a pattern diagram showing a schematic configuration of a routing table memorized in a node according to a second embodiment.

In other words, on the premise of a large memory capacity available as the routing table RT in the memory unit 12 as shown in FIG. 16, when the routing table RRT according to the second embodiment is configured by the main table MR and further, the sub-tables RR1 to RR3 having a relation similar to the sub-tables R1 to R3 in the first embodiment with respect to the main table MR. When a level number of the main table MR is set up to be "4", all level numbers of the sub-tables RR1 to RR3 may be set up to be "3". In such the case, entries of the levels 1 to 3 are multiplexed and entries of the level 4 are not multiplexed.

Here, in a case of FIG. 16, the main table MR covers up to level 4 whereas the sub-tables RR1 to RR3 cover up to only level 3. This is because as shown in the above-mentioned FIG. 3(D), there exists only one piece of node information to be described in the respective entries ME1 in the lowest level in the respective tables included in the routing table RRT. Therefore, in the second embodiment, it is impossible that the node information is described in the level corresponding to the level 4 in the sub-tables RR1 to RR3.

(V) Modified Embodiment of First Embodiment or Second Embodiment

Next, a modified embodiment related to the first embodiment or the second embodiment described above will be explained.

In the above-mentioned respective embodiments, the reference order of respective tables forming the routing table RT or RRT is determined as the order from smaller number based on the hop number up to the node being the transfer destination. However, in addition to this the following methods may be possible:

(i) determining based on loads required for giving and receiving message or the like;

(ii) determining in response to the order of receiving any message from the node N identified by the node information; and (iii) determining so that the larger number of the memory is referred earlier based on the number of the above-mentioned index information memorized.

In the case of (i), a merit is that the transfer process in the delivery system S can be carried out efficiently and promptly. In the case of (ii), a merit is that change of the message transfer route can be restricted to the minimum and the message can be efficiently transmitted because configuration change of respective tables can be restricted to the minimum. In the case of (iii), a merit is that giving and receiving necessary information can promptly start because the table is referred to in the order corresponding to the number of index information indicative of a possible node N related to the transfer process.

(VI) Third Embodiment

Figure 17:
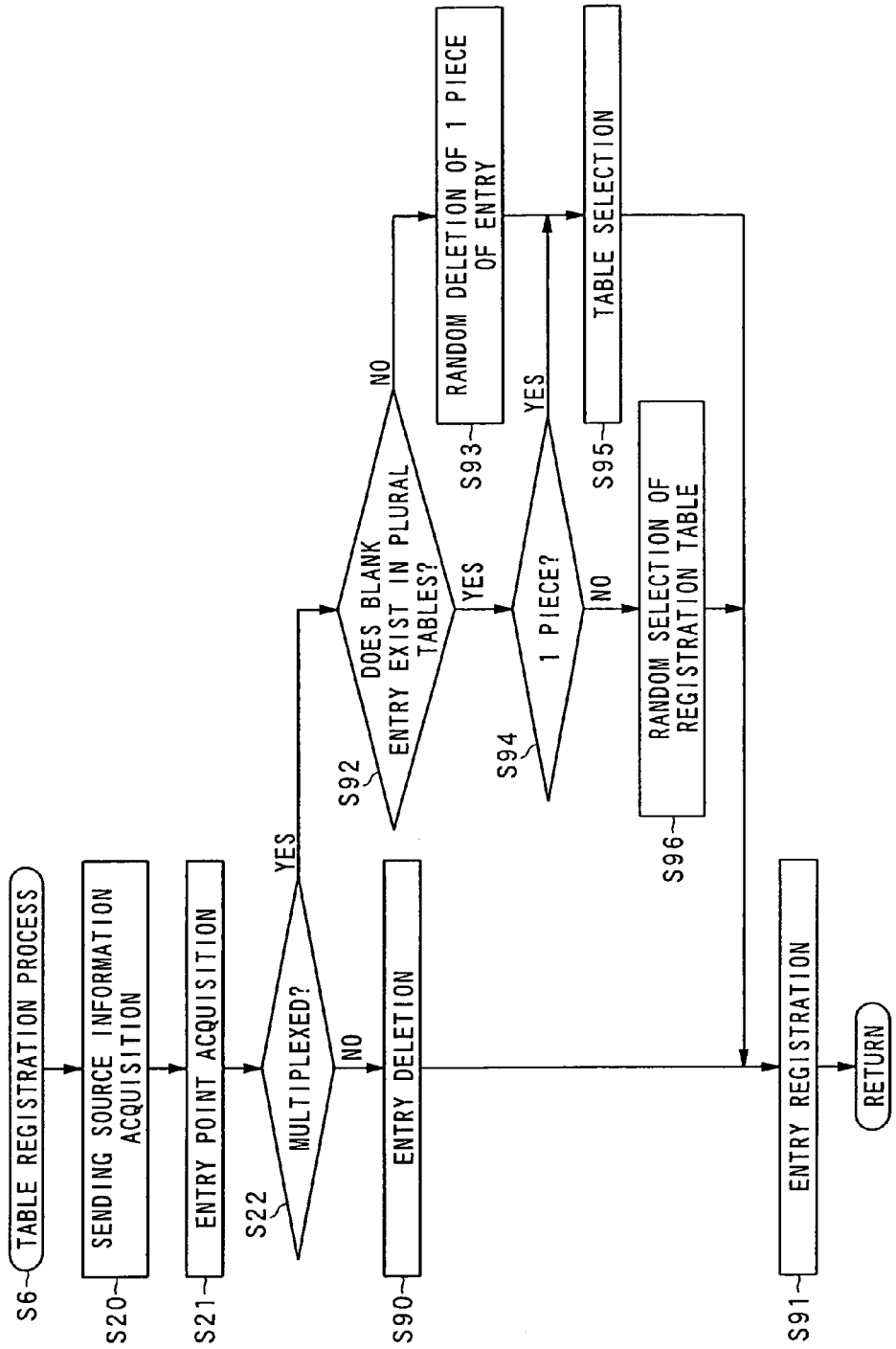
FIG. 17 is a flowchart showing a registration process into the routing table memorized in the node according to a third embodiment.
Figure 18:
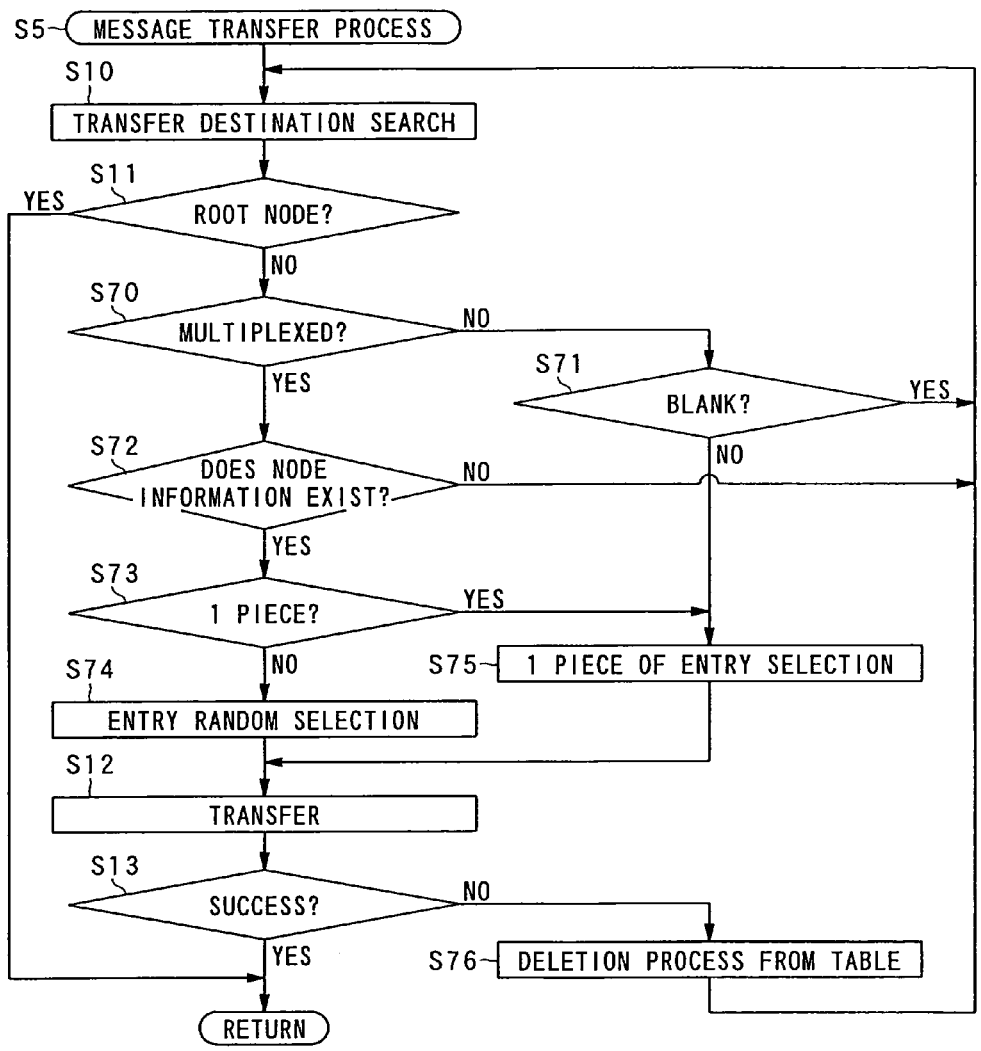
FIG. 18 is a flowchart showing a message transfer process according to the third embodiment.

The third embodiment being the other embodiment according to the present invention will be explained with reference of FIGS. 17 and 18. Here, FIG. 17 is a flowchart showing a registration process onto the table memorized according to the third embodiment. FIG. 18 is a flowchart showing a search process of the transfer destination node according to the third embodiment. In the respective flowcharts, a step number similar thereto is put to a process similar to the process according to the above-mentioned first embodiment and detailed explanation is omitted.

Because a configuration of respective nodes according to the third embodiment is basically similar to that of the node N according to the above-mentioned first or second embodiment, a similar element number is used for the construction element similar to the node N according to the first and second embodiments and detailed explanation is omitted.

Further, a configuration of the routing table according to the third embodiment may be similar to the configuration of the routing table RT according to the first embodiment explained, for example, with reference to FIG. 6, or may be similar to the configuration of the routing table RRT according to the second embodiment explained with reference to FIG. 16. However, in the routing table according to the third embodiment, the reference order is not provided in the respective tables unlike the above-mentioned routing table RT or RRT.

Next, the above-mentioned update process or the like related to the routing table according to the third embodiment will be specifically explained with reference to FIGS. 17 and 18. Here, the processes respectively corresponding to the respective flowcharts are carried out by the control unit 11 in the respective nodes N.

First, because an ordinary process in the node N related to the third embodiment is similar to the process explained with reference to the above-mentioned FIG. 8(*a*), the detailed explanation is omitted.

Next, the table registration process as the above-mentioned Step S6 according to the third embodiment will be specifically explained with reference to FIG. 17. Here, FIG. 17 is a flowchart showing the registration process.

In the registration process as shown in FIG. 17, first, node information indicative of the node of the sending source of the message received in Step S4 in FIG. 8(*a*) is acquired (Step S20), it is confirmed which one the entry E of the main table MR to describe the node information based on thus acquired node information (Step S21).

Next, it is confirmed whether or not thus confirmed entry E is a multiplexed entry (Step S22). When it is multiplexed (Step S22: YES), it is confirmed whether or not the blank entry E (i.e. entry having no node information described) in any table included in the routing table related to the third embodiment exists (Step S92). When the blank entry E does not exist (Step S92: NO), any entry E is selected. For example, at random among tables currently memorized and node information described thereof is deleted (Step S93). The table including the entry E having the node information deleted is selected (Step S95), new node information is described in the entry E included in thus selected table (entry E with its the node information deleted) (Step S91). Then the process goes to the process of Step S3 in FIG. 8(*a*).

On the other hand, in the judgment of Step S92, when the blank entry E exists (Step S92: YES), it is confirmed next whether or not there exists one blank entry E (Step S94).

When there exists one blank entry E (Step S94: YES), the process goes to Step S95 and further carries out the process of Step S91. On the other hand, when there exist several blank entries E (Step S94: NO), the table including the blank entry E is selected, for example at random (Step S96). Then new node information is described in the blank entry E included in thus selected table (Step S91). Then the process goes to the process of Step S3 in FIG. 8(*a*).

On the other hand, when it is multiplexed (Step S22; NO) in Step S22, node information currently described in the entry E is deleted (Step S90), new node information is described in the entry E (Step S91). Then the process goes to the process of Step S3 in FIG. 8(*a*).

Next, the message transfer process related to the third embodiment as the above-mentioned Step S5 is specifically explained with reference to FIG. 18. Here, FIG. 8 is a flowchart showing the message transfer process.

As the message transfer process shown in FIG. 18, in a case where any message is received (Refer to Step S4; YES in FIG. 8(*a*)), an entry to be a next transfer destination is first searched in the main table MR memorized by the own node (Step S10) in a manner similar to the first or second embodiment.

It is confirmed whether or not the own is proved to be the root node during the search process (Step S11). When the own is the root node (Step S11: YES), a process in response to the message is carried out because the node N of the transfer destination does not exist any longer. Then the process goes to the process of Step S6.

On the other hand, in the judgment of Step S11, when the own is not the root node (Step S11: NO), it is confirmed whether or not the entry E, where the transfer destination corresponding to the node ID designated during the search process belongs, is multiplexed (Step S70). In a case where it is not multiplexed (Step S70: NO), it is confirmed whether or not the entry E where the transfer destination belongs is blank (Step S71). When the entry E where the transfer destination belongs is blank (node information being not described) (Step S71: YES), the process returns to the above-mentioned Step S10 for searching the next transfer destination.

On the other hand, in the judgment of the above-mentioned Step S71, when the entry E is not blank but the node information is described (Step S71: NO), the entry E is selected as the search result (Step S75), the message thus received based on the search result is transferred (Step S12), and it is confirmed whether or not the transfer succeeds (Step S13).

In the confirmation of Step S13, when the transfer succeeds (Step S13: YES), the process goes to Step S6 in the above-mentioned FIG. 8(*a*). On the other hand, in a case where the transfer fails, for example, because the transfer destination node N withdraws from the delivery system S (Step S13: NO), the node information indicative of the transfer destination node N where the transfer fails is deleted from the routing table (Step S76), and the process returns to the above-mentioned Step S10 and a transfer destination node is searched again in the routing table after the deletion process (Step S76).

On the other hand, in the confirmation of Step S70, in a case where the entry E where the transfer destination belongs corresponding to the designated node ID is multiplexed (Step S70: YES), next it is confirmed whether or not the node information is described in any entry E thus multiplexed (Step S72). When the node information is not described in any entries E (Step S72: NO), the process returns to the above-mentioned Step S10 for searching the next transfer destination node.

Meanwhile, in the confirmation of Step S72, when node information is described in any entry E (Step S72: YES), it is confirmed whether or not the number of the entry E having the node information described is "1" (Step S73). When the number of the entry E is "1" (Step S73: YES), the blank entry E is selected (Step S75). Then the process goes to the process of Step S12 and onward.

Further, in the confirmation of Step S73, the number is not "1" but "2" or more (Step S73: NO), one among plural blank entries E is selected, for example at random (Step S74). Then the process goes to the process of Step S12 and onward.

Thus, since the process related to the routing table according to the third embodiment uses the routing table without its reference order preset, an effect similar to the first or second embodiment can be realized by simple processes.

Here, programs corresponding to flowcharts indicated respectively in the above-mentioned FIGS. 8 to 14, 17 and 18 are recorded onto an information recording medium such as a flexible disk and hard disk, or acquired and recorded through internet or the like, these are read out and carried out by the general computer thereby enabling to cause the computer to function as the control unit 11 in the node N according to the embodiments.

INDUSTRIAL APPLICABILITY

Thus, the present invention is applicable in the field of content delivery through a network. Particularly a remarkable effect can be obtained by application to the field of download-type content delivery.

The present invention is not confined to the configuration listed in the foregoing embodiments, but it is easily understood that the person skilled in the art can modify such configurations into various other modes, within the scope of the present invention described in the claims.

What is claimed is:

1. A node device which participates in an overlay network that is formed by a plurality of node devices being capable of connecting to a network, the node device comprising:
   a memory unit that memorizes a plurality of routing tables in which a plurality of network addresses of the node devices in the overlay network are registered;
   a searching unit configured to search a destination node device in the overlay network as a destination of a message transmission by referring to at least any one of the routing tables from the plurality of the routing tables in accordance with a predetermined referring order in response to transmitting a predetermined message through the overlay network; and
   a transmitting unit that transmits the message to the destination node device in the overlay network based on search result of the searching unit,
   wherein a number of the network addresses of the node devices in the overlay network which can be registered in the routing table to be first referred to by the searching unit is more than a number of the network addresses of the node devices in the overlay network which can be registered in the routing table other than the routing table to be first referred.

2. The node device according to claim 1, wherein the number of the network addresses of the node devices in the overlay network which can be registered in the routing table decreases as the referring order of the routing table becomes later.

3. The node device according to claim 1, wherein the number of the network addresses of the node devices in the overlay network which can be registered in the routing table exponentially decreases as the referring order of the routing table becomes later.

4. The node device according to claim 1, wherein the searching unit sequentially searches the plurality of routing tables in accordance with a predetermined referring order.

5. The node device according to claim 1, wherein a number of the routing table is preset in correspondence with a number that the node devices are withdrawn from the overlay network per a preset unit time.

6. The node device according to claim 1, wherein in response to be impossible to transmit the message to the destination node device searched as the destination of the message transmission, the searched destination node device corresponding to the network address registered in the routing table to be first referred to, the searching unit refers to the other routing table to be next referred to and searches a next destination node device in the overlay network as the destination of the message transmission.

7. The node device according to claim 1, further comprising:
   a delete unit configured to delete the network address from the routing table in response to being impossible to transmit the message to the destination node device searched as the destination of the message transmission, the searched destination node device corresponding to the network address registered in the routing table; and
   a registration changing unit configured to newly register the network address registered in the routing table to be referred to, next to the routing table which registered the deleted network address in the referring order.

8. The node device according to claim 1, wherein the routing table has at least one registration area for registering the network address, and the node device further comprising: a registration changing unit configured to, in response to newly registering the network address in a predetermined registration area in which the network address registered, newly register the registered network address in another routing table to be referred to in later referring order.

9. The node device according to claim 1, wherein the routing table, in earlier referring order, registers the network address of the node device which has a lower load required for receiving the message.

10. The node device according to claim 1, wherein the node device further comprises a receiving unit that receives messages transmitted from the other node devices, and
   the routing table, in earlier referring order, registers the network address of the node device which has transmitted the message later among the other node devices.

11. The node device according to claim 1, wherein the routing table in earlier referring order, registers the network address of the node device which stores a greater number of index information comprising a pair of contents identification information and node identification information, the contents identification information identifying contents distributed by the overlay network, the node identification information indicative of identifying the node device from other node devices in the overlay network.

12. The node device according to claim 1, wherein the routing table, in earlier referring order, registers the network address of the node device that has a lower hop number in the network from the node device comprising the memory unit.

13. An information processing method carried out in a node device which participates in an overlay network that is formed by a plurality of node devices being capable of connecting to a network, the method comprising:
   searching a destination node device in the overlay network as a destination of a message transmission by referring to at least any one of the routing tables from the plurality of the routing tables memorized in a memory unit in accordance with a predetermined referring order in response to transmitting a predetermined message through the overlay network, the memory unit memorizing a plurality of routing tables in which a plurality of network addresses of the node devices in the overlay network are registered; and
   transmitting the message to the destination node device in the overlay network based on search result, wherein a number of the network addresses of the node devices in the overlay network which can be registered in the routing table to be first referred to is more than a number of the network addresses of the node devices in the overlay network which can be registered in the routing table other than the routing table to be first referred.

14. A non-transitory computer-readable storage medium that stores a computer-executable program, the program causing a computer, which is in a node device which participates in an overlay network that is formed by a plurality of node devices being capable of connecting to a network, to perform steps comprising:

searching a destination node device in the overlay network as a destination of a message transmission by referring to at least any one of the routing tables from the plurality of the routing tables memorized in a memory unit in accordance with a predetermined referring order in response to transmitting predetermined message through the overlay network, the memory unit memorizing a plurality of routing tables in which a plurality of network addresses of the node devices in the overlay network are registered; and transmitting the message to the destination node device in the overlay network based on search result, wherein a number of the network addresses of the node devices in the overlay network which can be registered in the routing table to be first referred to is more than a number of the network addresses of the node devices in the overlay network which can be registered in the routing table other than the routing table to be first referred.

15. A node device which participates in an overlay network that is formed by a plurality of node devices being capable of connecting to a network, the node device comprising:

a memory unit that memorizes a plurality of routing tables in which a plurality of network addresses of the node devices in the overlay network are registered;

a searching unit that searches a destination node device in the overlay network as a destination of a message transmission by referring to at least any one of the routing tables from the plurality of the routing tables in accordance with a predetermined referring order in response to transmitting a predetermined message through the overlay network; and a transmitting unit that transmits the message to the destination node device in the overlay network based on search result of the searching unit, wherein a number of the network addresses of the node devices in the overlay network which can be registered in the routing table to be first referred to by the searching unit is more than a number of the network addresses of the node devices in the overlay network which can be registered in the routing table other than the routing table to be first referred.

16. The node device according to claim 15, wherein the routing table, in earlier referring order, registers the network address of the node device that has a lower hop number in the network up to the node device identified by the network address registered in the routing table.

* * * * *